United States Patent
Booij

(10) Patent No.: US 11,662,422 B2
(45) Date of Patent: May 30, 2023

(54) POSITION DETERMINING SYSTEM DETERMINING DOPPLER-INDUCED CODE PHASE DEVIATION

(71) Applicant: Sonitor Technologies AS, Oslo (NO)

(72) Inventor: Wilfred Edwin Booij, Nordby (NO)

(73) Assignee: Sonitor Technologies AS, Oslo (NO)

( * ) Notice: Subject to any disclaimer, the term of this patent is extended or adjusted under 35 U.S.C. 154(b) by 373 days.

(21) Appl. No.: 16/641,442

(22) PCT Filed: Aug. 22, 2018

(86) PCT No.: PCT/GB2018/052385
§ 371 (c)(1),
(2) Date: Feb. 24, 2020

(87) PCT Pub. No.: WO2019/038542
PCT Pub. Date: Feb. 28, 2019

(65) Prior Publication Data
US 2020/0200863 A1 Jun. 25, 2020

(30) Foreign Application Priority Data

Aug. 24, 2017 (GB) ...................................... 1713639

(51) Int. Cl.
*G01S 5/26* (2006.01)
(52) U.S. Cl.
CPC ...................................... *G01S 5/26* (2013.01)
(58) Field of Classification Search
CPC .................................................... H04B 11/00
See application file for complete search history.

(56) References Cited

U.S. PATENT DOCUMENTS

| 4,187,491 A | 2/1980 | Lindstrum et al. |
| 5,029,147 A | 7/1991 | Andrews et al. |

(Continued)

FOREIGN PATENT DOCUMENTS

| JP | 2005-249770 A | 9/2005 |
| JP | 2014-513287 A | 5/2014 |

(Continued)

OTHER PUBLICATIONS

Communication pursuant to Article 94(3) EPC, dated Jan. 4, 2022 for counterpart European Application No. EP 18 762 596.7, 4 pages.

(Continued)

*Primary Examiner* — Isam A Alsomiri
*Assistant Examiner* — Joseph C Fritchman
(74) *Attorney, Agent, or Firm* — Sterne, Kessler, Goldstein & Fox P.L.L.C.

(57) ABSTRACT

A system is provided for determining the position of a mobile receiver unit (7) in an environment (1). The system comprises a plurality of transmitter units (2, 3, 4, 5) which transmit a respective phase-modulated transmitter-unit identifier, a mobile receiver unit (7), arranged to receive a signal from a transmitter unit (2, 3, 4, 5), and a processing subsystem (205; 9). The processing subsystem (205; 9) is configured to sample received signals to generate sampled data, wherein the identifier spans a transmitter-unit-identifier-bearing portion of the sampled data, obtain template data corresponding to the identifier, analyse the sampled data to determine a Doppler-induced phase deviation, adjust the template or the sampled data to change one or more phase shifts by an amount depending on the determined deviation, cross-correlate the template with the sampled data, determine a time-of-arrival of the signal, decode the identifier from the sampled data, and use the time-of-arrival (Continued)

and the decoded identifier to determine information relating to the position

19 Claims, 9 Drawing Sheets

(56) References Cited

U.S. PATENT DOCUMENTS

| | | | |
|---|---|---|---|
| 6,292,106 | B1 | 9/2001 | Solinsky et al. |
| 6,469,656 | B1 | 10/2002 | Wagner et al. |
| 6,512,720 | B1 | 1/2003 | Yang |
| 7,030,811 | B2 | 4/2006 | Goren et al. |
| 7,430,257 | B1 | 9/2008 | Shattil |
| 7,630,792 | B2 | 12/2009 | Kim |
| 7,936,305 | B2 | 5/2011 | Small |
| 8,044,839 | B2 | 10/2011 | Sutphin |
| 8,305,842 | B2 | 11/2012 | Holdsworth |
| 8,704,702 | B2 | 4/2014 | van Dorp |
| 9,860,085 | B1 * | 1/2018 | Pettijohn ............... H04B 7/01 |
| 2002/0097182 | A1 | 7/2002 | Goren et al. |
| 2003/0142587 | A1 | 7/2003 | Zeitzew |
| 2004/0071200 | A1 | 4/2004 | Betz et al. |
| 2005/0232081 | A1 | 10/2005 | Holm |
| 2006/0250294 | A1 | 11/2006 | Zemany et al. |
| 2007/0133711 | A1 | 6/2007 | Li |
| 2009/0061899 | A1 | 3/2009 | Hwang et al. |
| 2009/0067514 | A1 | 3/2009 | Stojanovic |
| 2009/0149202 | A1 | 6/2009 | Hill et al. |
| 2011/0090762 | A1 | 4/2011 | Rhodes et al. |
| 2012/0044786 | A1 * | 2/2012 | Booij ..................... G01S 5/18 367/127 |
| 2014/0169136 | A1 * | 6/2014 | Booij ..................... G01S 1/75 367/117 |
| 2015/0070204 | A1 * | 3/2015 | Shirakawa ............ G01S 7/0235 342/128 |
| 2015/0160330 | A1 | 6/2015 | Booij et al. |
| 2015/0253413 | A1 | 9/2015 | Booij et al. |
| 2017/0143267 | A1 * | 5/2017 | Kovacs .................. G16H 50/20 |
| 2019/0359226 | A1 | 11/2019 | Ochida et al. |

FOREIGN PATENT DOCUMENTS

| | | | |
|---|---|---|---|
| JP | 2015-052527 | A | 3/2015 |
| JP | 2017-032535 | A | 2/2017 |
| JP | 2017032535 | A * | 2/2017 |
| WO | WO 2004/027444 | A2 | 4/2004 |
| WO | WO 2012/137017 | A2 | 10/2012 |
| WO | WO 2016/011433 | A2 | 1/2016 |
| WO | WO 2019/038542 | A2 | 2/2019 |

OTHER PUBLICATIONS

Roberts et al., "Evolution of the Air Interface of Cellular Communications Systems Toward 4G Realization," Air Force Institute of Technology, IEEE Communications Surveys & Tutorials (2006), 22 pages.
Foucras et al., "A Novel Computationally Efficient Galileo E1 OS Acquisition Method for GNSS Software Receiver," 25th International Meeting of the Satellite Division of the Institute of Navigation, Nashville, TN, Sep. 17-21, 2012, 19 pages.
Perez et al., "Ultrasonic Beacon-Based Local Positioning System Using Loosely Synchronous Codes", Intelligent Signal Processing, 2007, Oct. 3, 2007, pp. 1-6.
Jiminez et al., "FPGA-Based Implementation of an Ultrasonic Beacon for a Local Positioning System", IEEE Industrial Electronics, Nov. 1, 2006, pp. 4945-4950.
Foucras et al., "Detailed Analysis of the Impact of the Code Doppler on the Acquisition Performance of New GNSS Signals", ION ITM 2014, International Technical Meeting of the Institute of Navigation, Jan. 2014, San Diego, United States.
International Search Report dated Mar. 8, 2019 for Appl. No. PCT/GB2018/052385, 6 pages.
Written Opinion dated Mar. 8, 2019 for Appl. No. PCT/GB2018/052385, 11 pages.
Japanese Office Action for Appl. No. 2020-511235, dated Mar. 10, 2022, with machine translation, 11 pages.
Suzuki et al. "Realtime Correlation Calculation for Distance Measurement Using Spread Spectmm Ultrasonic Waves", T. SICE, vol. 46, No. 7, Jul. 2010, pp. 357-364, with English abstract.
Chinese Office Action for Appl. No. 208180068615.4, dated Feb. 8, 2023, with machine translation, 30 pages.

* cited by examiner

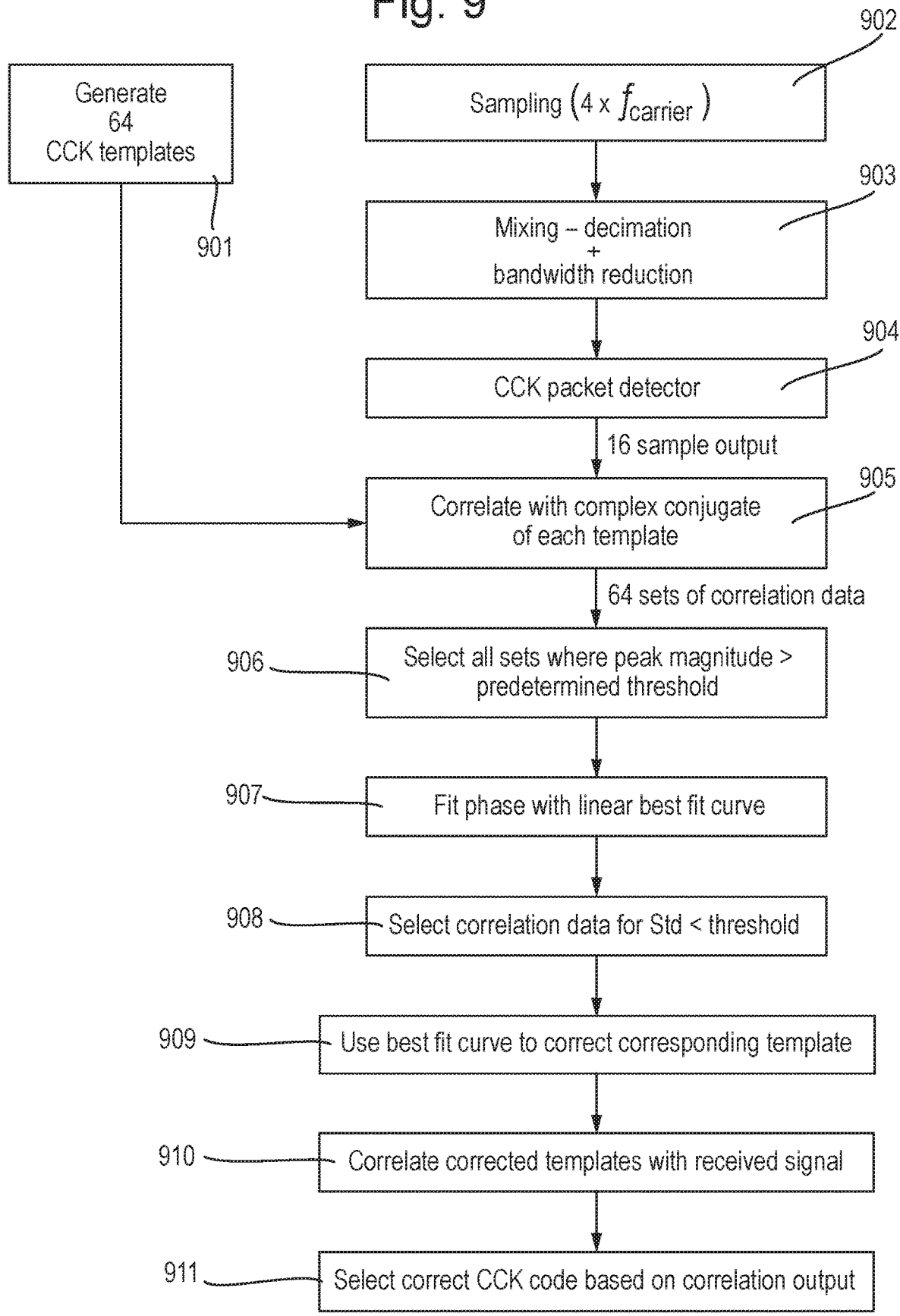

POSITION DETERMINING SYSTEM DETERMINING DOPPLER-INDUCED CODE PHASE DEVIATION

This invention relates to systems and methods for determining the position of a mobile receiver unit.

It is known to use signals, such as ultrasonic signals, to determine the position of mobile units, or tags, in three dimensions by transmitting signals from a plurality of transmitter units (which may be fixed to the walls or ceilings of a building). The signals encode identifiers of the respective transmitters units. These signals are received by the mobile receiver units (which may be attached to objects such as people or equipment). If the positions of the static transmitter units are known, the times of arrival of a set of signals at one of the mobile units can be used to estimate the position of that mobile unit in the environment, using standard geometric calculations. An example of such a system is described in U.S. Pat. No. 6,292,106 (Cubic Defence Systems, Inc.).

In WO 2012/137017 the applicant has disclosed a positioning system in which a plurality of static transmitter stations transmit respective phase-modulated signatures. Each signature is made up of two or more instances of an 11-bit Barker code, having temporal and phase offsets that are specific to the respective transmitter station. Signatures are received by a mobile receiver unit and their times of arrival are used to determine the position of the receiver unit. A transmission may also include optional message data. Because of the potential for motion-induced phase changes in the ultrasound signal, due to the Doppler effect, the receiver unit does not mix a re-generated carrier signal with a received signal using a quadrature modulator, as might typically be done in a synchronous radio system. Instead, the received signal is cross-correlated with a reference copy of the Barker code, generating a complex correlation signal, $Z(i)$, containing both in-phase and quadrature information, from which the presence and arrival time of a signature corresponding to a particular transmitter station are determined.

While the approach described in WO 2012/137017 has been found to be quite effective, the applicant has found that further accuracy and reliability improvements can be made to the signalling as described in this application.

The present invention therefore seeks to provide an improved approach.

From a first aspect, the invention provides a system for determining the position of a mobile receiver unit in an environment, the system comprising:
  a plurality of transmitter units, each comprising a transmitter and configured to transmit a respective transmitter-unit identifier, phase-modulated on a carrier signal;
  a mobile receiver unit comprising a receiver and configured to receive a signal, from a transmitter unit of said plurality of transmitter units, encoding a transmitter-unit identifier; and
  a processing subsystem configured to:
    sample received signals to generate sampled data representing the received signals, wherein the transmitter-unit identifier spans a transmitter-unit-identifier-bearing portion of the sampled data;
    obtain template data corresponding to the transmitter-unit identifier;
    analyse the sampled data to determine a Doppler-induced phase deviation within the transmitter-unit-identifier-bearing portion of the sampled data;
    adjust the template data or the sampled data so as to change one or more phase shifts within the template data or within the transmitter-unit-identifier-bearing portion of the sampled data by an amount that depends on the determined Doppler-induced phase deviation;
    cross-correlate the template data with the sampled data, after said adjusting;
    determine a time of arrival of the transmitter-unit identifier at the mobile receiver unit;
    decode the transmitter-unit identifier from the sampled data; and
    use said time of arrival and the decoded transmitter-unit identifier to determine information relating to the position of the mobile receiver unit in the environment.

From a second aspect, the invention provides a method of determining the position of a mobile receiver unit in an environment, the method comprising:
  sampling signals received by the mobile receiver unit to generate sampled data representing the received signals, wherein a transmitter-unit identifier of a transmitter unit spans a transmitter-unit-identifier-bearing portion of the sampled data;
  providing template data corresponding to said transmitter-unit identifier;
  analysing the sampled data to determine a Doppler-induced phase deviation within the transmitter-unit-identifier-bearing portion of the sampled data;
  adjusting the template data or the sampled data so as to change one or more phase shifts within the template data or within the transmitter-unit-identifier-bearing portion of the sampled data by an amount that depends on the determined Doppler-induced phase deviation;
  cross-correlating the template data with the sampled data, after said adjusting;
  determining a time of arrival of the transmitter-unit identifier at the mobile receiver unit;
  decoding the transmitter-unit identifier from the sampled data; and
  using said time of arrival and the decoded transmitter-unit identifier to determine information relating to the position of the mobile receiver unit in the environment.

Thus it will be seen by those skilled in the art that, in accordance with the invention, changes to the transmitted transmitter-unit identifier, caused by relative movement between the mobile receiver unit and a transmitter unit, are compensated for before the transmitter-unit identifier is cross-correlated with template data in order to determine a time of arrival. This has been found to result in a more accurate cross-correlation result, which gives rise to a higher rate of successful decoding of the transmitter-unit identifiers received by the mobile receiver unit.

This contrasts with the approach described in WO 2012/137017 where the received signal is cross-correlated with the 11-bit Barker code without any such compensation. WO 2012/137017 instead teaches applying compensation for motion-induced phase shift after this cross-correlation has been performed, and then only to compensate the decoding of any optional message data which may follow the signature (not to the decoding of the signature itself).

However, the applicant has now realised that, by applying a phase adjustment to the raw samples, or to the raw template data, before performing a cross-correlation of the samples with the template data, the likelihood of correctly detecting a transmitted transmitter-unit identifier can be significantly improved.

The advantages of the invention are especially apparent where the mobile receiver unit is expected to move at speeds that are within two or three orders of magnitude of the speed of the signals in the environment. The transmitted signals may be electromagnetic signals—e.g., radio signals or optical signal—but, in a preferred set of embodiments, they are acoustic signals. They may be ultrasonic signals. Ultrasonic signals are acoustic signals having a frequency higher than the normal human hearing range; typically this means signals having a frequency greater than 20 kHz, e.g. between 30 and 100 kHz.

Acoustic signals are particularly well suited to use in positioning systems, especially indoors, because they travel much slower than radio waves and light waves. Embodiments using acoustic signals may therefore require less accurate time measurements for a given spatial resolution, compared with those using speed-of-light signals.

The environment may be an indoors environment, although this is not essential. It may, for example, comprise one or more buildings, such as a shopping mall, hospital, warehouse, office complex, domestic residence, etc.

The transmitter units may be mobile, but are preferably static. They may, for instance, be secured to respective structural members of a building, such as to one or more walls or ceilings. Whether the transmitter units are mobile or static, or a combination of both, their locations may be known to the processing subsystem. This can help the processing subsystem to determine the position of the mobile receiver unit in the environment.

Each transmitter unit preferably transmits its respective transmitter-unit identifier repeatedly, at intervals—e.g., periodically. This enables the position of the mobile receiver unit to be tracked over time.

The mobile unit may comprise some or all of the processing subsystem. This may avoid the need to communicate data from the mobile receiver unit to be processed elsewhere—e.g., on a remote server.

In some embodiments one or more of the transmitter units may comprise some or all of the processing subsystem. Some or all of the processing subsystem may be external to the mobile receiver unit and the transmitter units—e.g. on one or more external servers. This may be advantageous in reducing the processing requirement on the mobile receiver unit, which can reduce its cost and power consumption, even after accounting for the need to transmit data from the mobile receiver unit (e.g., by radio). This is especially useful when the mobile receiver unit is battery powered. The processing subsystem may be split across multiple processors or multiple locations, or both. The mobile receiver unit may be configured to transmit the received signal, or information derived therefrom, to a remote processing unit. The mobile receiver unit and/or a transmitter unit may comprise a wired or wireless transmitter, such as a radio transmitter, for transmitting information relating to a received or transmitted signal.

The system may comprise a radio transmitter arranged to transmit timing information to the transmitter units and/or the mobile receiver unit. The transmitter units and mobile receiver unit may be synchronised so that time of arrival information can be used for positioning, instead of time difference of arrival. This can require fewer transmitter units to be in range and can be more accurate.

Preferably the processing subsystem is configured to use a respective transmission time and/or a respective time of arrival of one or more signals to determine information relating to the respective distances between the mobile receiver unit and one or more of the transmitter units, and to use this distance information when determining the position of the mobile receiver unit.

The mobile receiver unit may be configured to receive a plurality of said signals from different transmitter units, and the processing subsystem may be configured to decode the received transmitter-unit identifiers and to use the transmitter-unit identifiers to determine information relating to the position of the mobile receiver unit.

The processing subsystem may use signal strength and/or time of arrival and/or time difference of arrival information to determine the information relating to the position of the mobile receiver unit—for example, by performing a trilateration calculation, familiar to those skilled in the art. Information relating to the position of the mobile receiver unit may, for example, comprise an estimated position coordinate of the mobile unit relative to a fixed origin. The position information may relate to the position of the mobile receiver unit in two dimensions or three dimensions.

The processing subsystem may use the determined Doppler-induced phase deviation to determine speed or velocity information for the mobile receiver unit. The speed of velocity information may be absolute (e.g., speed over the ground), or it may be relative; in particular, if one or more of the transmitter units is mobile, the speed or velocity information may be relative to a mobile transmitter unit, which may itself be in motion. This speed or velocity information may additionally be used when determining information relating to the position of the mobile receiver unit. For example, the processing subsystem may use a Kalman filter to determine the position information, and may input the velocity information to the Kalman filter, e.g. in addition to a sequence of values of the distance between the mobile receiver unit and one or more of the transmitter units.

The mobile receiver unit may be a dedicated positioning tag—e.g., comprising means for fastening the tag to a person or an object, for tracking the person or object—or it may be a portable electronics appliance, having additional functions, such as a mobile telephone or a tablet computer.

The mobile receiver unit may contain all of the processing subsystem—this may be particularly appropriate when the mobile receiver unit has a display screen and powerful processor, for instance if it is a smartphone. In this case, the mobile receiver unit may be arranged to store the information relating to its position.

In other embodiments, the mobile receiver unit may comprise only some parts, or even none, of the processing subsystem—e.g., comprising a sampler for sampling the receiver signal—while other parts of the processing subsystem—e.g., elements configured to use a time of arrival and decoded transmitter-unit identifier to determine the position of the mobile receiver unit—may reside in one or more other units, such as on a remote computer or server. The mobile receiver unit may comprise a radio, optical, or other transmitter—e.g., a Bluetooth, WiFi or cellular network transmitter. It may use the transmitter to transmit data relating to the received ultrasound signals to a remote processing unit; this could be an analogue sound file, or digital samples, or processed data.

The transmitter of each transmitter unit may comprise a radio antenna, light-emitting element, acoustic transducer, or other appropriate means of transmitting the phase-modulated carrier signal. It may comprise appropriate circuitry for driving or controlling the transmission, such as a DAC, an amplifier, etc. In a preferred set of embodiments, each transmitter unit comprises at least one ultrasound transducer for generating ultrasonic signals.

The processing subsystem and/or each transmitter unit and/or the mobile receiver unit may comprise any one or more of processors, DSPs, ASICs, FPGAs for carrying out the described steps. It may comprise memory for storing data and/or for storing software instructions to be executed by a processor, DSP or FPGA. It may comprise any other appropriate analogue or digital components, including power supplies, oscillators, ADCs, DACs, RAM, flash memory, network interfaces, user interfaces, etc. It may be a single unit or may comprise a plurality of processing units, which may be arranged to communicate by one or more wired or wireless links.

The position-determining system preferably further comprises data storage and/or a display and/or a data connection, and is arranged to store and/or display and/or communicate electronically the information relating to the position of the mobile receiver unit. The system may, for example, be arranged to indicate the position of the mobile receiver unit on a map or plan of a building or the environment.

Each transmitter unit may be configured to transmit a different transmitter-unit identifier. The processing subsystem may be arranged to determine an identity of a transmitter unit from a decoded transmitter-unit identifier. The processing subsystem may access information relating to a location of the transmitter unit in the environment, and may use this information when determining the position of the mobile receiver unit. It will be appreciated, however, that in larger systems it may be necessary to share identifiers between transmitter units. This may be done by ensuring that identifiers are not shared between transmitter units that have overlapping transmission ranges, or by providing additional information which the processing subsystem may use to determine an identity of a transmitter unit from a decoded transmitter-unit identifier.

Each transmitter-unit identifier may comprise or be a predetermined pattern. Each transmitter-unit identifier may be a phase-shift-key (PSK)-encoded, or differential phase-shift-key (DPSK)-encoded, sequence or code—e.g., a quadrature (QPSK)-encoded sequence. The transmitter-unit identifiers are preferably all a common length. While the transmitter-unit identifier, phase-modulated on a carrier signal, may comprise one or more Barker codes, as described in WO 2012/137017 (the entire contents of which are hereby incorporated by reference), in preferred embodiments the transmitter-unit identifier comprises or is a Complementary Code Keying (CCK) code. The transmitter-unit identifier may be a single CCK code. The CCK code may be eight complex chips long (corresponding to sixteen bits). Each transmitter unit may be configured to transmit a different respective CCK code as a transmitter-unit identifier.

As is known in the art, CCK codes are sequences that give strong autocorrelation at zero offset, and low autocorrelation at non-zero offsets. Their autocorrelation properties making them highly tolerant to intersymbol interference caused by multipath propagation in a wireless communication environment. CCK codes of length 8 chips are known, which are intended to be QPSK-encoded on a carrier wave.

Of course, other transmitter-unit identifiers and/or phase-modulation schemes may be used, such as Golay codes, gold codes, M-ary Orthogonal Keying, quadrature amplitude modulation (QAM), etc.

Because of the potential for motion-induced phase changes in the acoustic signal, it is not in general desirable to mix a re-generated carrier signal with the received signal using a quadrature modulator, as would typically done in a synchronous radio receiver. Instead, the processing subsystem cross-correlates template data with the sampled data. (It will be appreciated that this cross-correlation operation may be implemented in any appropriate way, and may cross-correlate the template data with the sampled data, or vice versa).

The template data may be generated by the processing subsystem or may be retrieved by the processing subsystem—e.g., from a memory. The template data for the transmitter-unit identifier may comprise a set of values (which may be complex values) representing the phase-modulated transmitter-unit identifier, preferably at baseband, sampled at intervals. However, other representations are, of course, possible.

The transmitter units may transmit their respective transmitter-unit identifiers at a common chip (or symbol) rate. A chip preferably corresponds to a fundamental symbol of the phase-modulation, such as a bit-pair when QPSK is used. The processing subsystem may sample the received signal at a sampling rate which is equal to, or preferably greater than, the chip rate—e.g., at least twice or four times the chip rate. It may initially sample the received signal at a higher rate and then down-sample (e.g., using decimation), to a lower sampling rate. This lower sampling rate may still be greater than the chip rate—preferably at least twice the chip rate—but preferably no more than 16, 8 or 4 times the chip rate. The processing subsystem may sample the received signal at a minimum of four times the chip rate in order to reduce the risks of sampling directly on phase transition edges of the received chips.

The processing subsystem may be configured to use a sliding energy window to detect the transmitter-unit identifier within the sampled data. The length of the energy window may equal the length of the transmitter-unit identifier.

The energy window may be applied to the sampled data to generate a sequence of energy values, each energy value representing the energy of the samples within the energy window at a respective position of the energy window within the sampled data. The positions may correspond to the samples—e.g., one to one, such that the energy window is stepped over the sampled data one sample at a time. (Note that the received signal may first be down-sampled from a higher initial sampling rate, as previously explained.) The transmitter-unit identifier may be detected by identifying a peak in the energy values. The processing subsystem may require the peak to meet one or more criteria, such as exceeding a threshold level, for the transmitter-unit identifier to be detected. Each energy value may represent an average or a total of energy or power values of some or all the samples within the energy window, in any appropriate way.

Since the energy level of samples representing the transmitter-unit identifier is expected to be higher than the energy level of samples representing background noise, the sequence of energy values is expected to be at its highest when the energy window is exactly aligned with the transmitter-unit-identifier-bearing portion of the sampled data.

When the transmitter-unit identifier has been detected at a particular position of the sliding energy window, the samples within the energy window at the position may be selected as the transmitter-unit-identifier-bearing portion of the sampled data The energy window may be arranged to ignore samples at one or more fixed positions within the window. This may be used to filter out samples of the received signal that are likely to be affected by artefacts, e.g., caused by practical limitations in the responsiveness of transducers on the transmitter units and/or mobile receiver unit to phase shifts. For instance, in some embodiments an energy window function of the energy window may ignore the first and/or last samples of each chip of the transmitter-unit identifier, since samples at a boundary between consecutive chips of the transmitter-unit identifier are more likely to experience unstable magnitude variations due to potential phase shifts which may otherwise negatively affect the energy or power calculation within the energy window.

A time of arrival of the transmitter-unit identifier may be determined from the temporal position of the peak in the energy values. This time of arrival or temporal position may then be used to select a set of samples spanning the transmitter-unit-identifier-bearing portion of the sampled data, for further analysis. The time of arrival may be determined at a resolution of one sampling interval. However, in some embodiments, the processing subsystem may derive gradient information from the energy values, and use the gradient information to identify a location of a peak in the energy values at a temporal resolution that is finer than said intervals. A peak detector may identify peaks based on a sliding peak-detection window spanning three successive energy values. At each position in the energy value sequence, a gradient before the position and a gradient after the position may be used to identify a peak. These magnitudes of these gradients may be used to estimate the location of the peak. The peak detection may also require the second derivative of the energy values to satisfy a condition for a peak to be detected, since this can provide even better separation of peaks from noise.

Although, in some embodiments, a more precise time of arrival may be determined subsequently, the time of arrival from the energy window could be used on its own for saving power. Thus, in some embodiments, if a time of flight determined from the temporal position of the peak in the energy values is the same as, or within a threshold of, a previously-determined time of flight (determined from an earlier transmission by the transmitter unit), the processing subsystem may not perform further analysis of the samples in the energy window; it may remain in a low-power mode. The processing system may be configured only to perform the analysis when a distance between the mobile receiver unit and one or more of the transmitter units has changed by more than the threshold amount.

This approach to detecting a phase- or frequency-modulated signal of fixed length within sampled signal data using an energy window of corresponding length is believed to be novel in its own right.

Thus, from a further aspect, the invention provides a method of detecting a phase- or frequency-modulated signal having a fixed length, the method comprising:
sampling received signals at intervals to generate sampled data;
applying a sliding energy window, having a length equal to said fixed length, to the sampled data to generate a sequence of energy values, each energy value representing the energy of the samples within the energy window at a respective position of the energy window within the sampled data; and
detecting said fixed-length phase- or frequency-modulated signal by identifying a peak in the energy values.

From another aspect, the invention provides a receiver apparatus for detecting a phase- or frequency-modulated signal having a fixed length, the receiver apparatus comprising:
an input for receiving wireless signals; and
a processing system,
wherein the processing system is configured to:
sample signals received at said input at intervals to generate sampled data;
apply a sliding energy window, having a length equal to said fixed length, to the sampled data to generate a sequence of energy values, each energy value representing the energy of the samples within the energy window at a respective position of the energy window within the sampled data; and
detect said fixed-length phase- or frequency-modulated signal by identifying a peak in the energy values.

The peak may have to meet one or more criteria, such as exceeding a threshold level, for the fixed-length phase- or frequency-modulated signal to be detected.

The use of gradient information in the energy values to estimate a time of arrival of a fixed-length phase- or frequency-modulated signal is also believed to be novel in its own right.

Thus, from a further aspect, the invention provides a method of estimating a time of arrival of a phase- or frequency-modulated signal having a fixed length, the method comprising:
sampling received signals at intervals to generate sampled data;
applying a sliding energy window, having a length equal to said fixed length, to the sampled data to generate a sequence of energy values, each energy value representing the energy of the samples within the energy window at a respective position of the energy window within the sampled data;
deriving gradient information from the energy values, and using the gradient information to identify a location of a peak in the energy values at a temporal resolution that is finer than said intervals; and
estimating a time of arrival of said phase- or frequency-modulated signal from the position of said peak.

From another aspect, the invention provides a receiver apparatus for estimating a time of arrival of a phase- or frequency-modulated signal having a fixed length, the receiver apparatus comprising:
an input for receiving wireless signals; and
a processing system,
wherein the processing system is configured to:
sample signals received at said input at intervals to generate sampled data;
apply a sliding energy window, having a length equal to said fixed length, to the sampled data to generate a sequence of energy values, each energy value representing the energy of the samples within the energy window at a respective position of the energy window within the sampled data;
derive gradient information from the energy values, and use the gradient information to identify a location of a peak in the energy values at a temporal resolution that is finer than said intervals; and
estimate a time of arrival of said phase- or frequency-modulated signal from the position of said peak.

The phase- or frequency-modulated signal having a fixed length may be a transmitter-unit identifier as previously described. Features of any aspect or embodiment disclosed herein may be features of embodiments of these aspects also, and vice versa, wherever appropriate.

In any aspects disclosed herein, there are many different ways in which the sampled data may be analysed to determine a Doppler-induced phase deviation. There are also many different ways in which the template data or the sampled data can be adjusted, and in which they can be cross-correlated to determine a time of arrival of the transmitter-unit identifier. There are also many different ways in which the transmitter-unit identifier can be decoded from the sampled data.

The transmitter-unit-identifier-bearing portion, from which the phase deviation is determined, may equal the length of the transmitter-unit identifier in the sampled data, or it may be smaller than the transmitter-unit identifier. If it only covers a portion of the encoded transmitter-unit identifier, the sampled data may, in some embodiments, be adjusted so as additionally to change one or more phase shifts outside the transmitter-unit-identifier-bearing portion by an amount that depends on the determined Doppler-induced phase deviation.

In one set of embodiments, each encoded transmitter-unit identifier comprises a first symbol at a first position and a second symbol at a second position, wherein the first and second symbols have a predetermined phase relationship. The first and second positions are preferably the same for all the transmitter-unit identifiers. They may be adjacent symbols. The predetermined phase relationship is preferably the same for all the transmitter-unit identifiers. Each encoded transmitter-unit identifier may comprise further reference symbols at predetermined positions, all having predetermined phase differences.

The processing subsystem may determine the Doppler-induced phase deviation from samples of these reference symbols. The processing subsystem may optionally also analyse one or more samples of a distinguishing portion of the received transmitter-unit identifier, which differs between the transmitter units, to determine a phase deviation; however, because the phase of these samples is not typically known to the processing subsystem in advance, in some embodiments only the reference symbols are analysed for determining the Doppler-induced phase deviation.

For example, the transmitter-unit identifiers may all comprise a preamble consisting of two or more predetermined QPSK bit-pairs. These may serve as reference symbols because the phase transition from the first bit-pair to the second bit-pair (e.g., plus 90 degrees) is known in advance, and is the same for all transmitter-unit identifiers. In some embodiments, the last bit-pair of these two or more QPSK bit-pairs may be the first chip of a CCK code. In this case, the remaining seven chips of the CCK may form the distinguishing portion of each transmitter-unit identifier.

Preferably, the first and second symbols are adjacent symbols and are offset by 180 degrees. Including such a maximal phase change at a known position in each transmitter-unit identifier has been found to improve the accuracy of the Doppler-induced phase deviation measurement. It can also improve the temporal accuracy of the time of arrival measurement from the cross-correlation. However, other phase offsets can also be used.

The processing subsystem may determine a Doppler-induced phase deviation by calculating a rate of phase deviation (not due to coding) over the samples relating to the reference symbols. It may multiply at least some of these samples by the complex conjugate of the respective symbols transmitted at the corresponding sample positions. This removes phase shifts due to the coding and phase-modulation. It may phase-unwrap the resulting values, to generate a set of values in continuous phase space. The processing subsystem may characterise a linear phase deviation from the set of values (preferably after unwrapping). It may determine a gradient for the set of unwrapped values—e.g., using linear regression. This gradient may represent the Doppler-induced phase deviation.

One or more samples may be excluded from the multiplication operation, such as samples that are adjacent to a position of a known phase transition in all the transmitter-unit identifiers. This can improve the accuracy of the estimate of the Doppler-induced phase deviation by removing samples that could be unreliable due to artefacts introduced in the transmitting or receiving transducers or antennae.

The processing subsystem may then use the gradient, or other characterisation of the linear phase deviation, to adjust some or all of the samples within the transmitter-unit-identifier-bearing portion of the sampled data. It may do this by rotating each sample by an angle that is determined from the gradient or characterisation, e.g. by linear extrapolation.

In some embodiments, the processing subsystem determines a subset of samples within the transmitter-unit-identifier-bearing portion to adjust. The processing subsystem may use samples of the reference symbols to select samples of the transmitter-unit identifier for performing said adjustment and/or for use in decoding the transmitter-unit identifier. The processing subsystem may use the samples of the reference symbols to select a sample from each chip of the transmitter-unit identifier that is substantially unaffected by slow transducer phase response (in changing phase output between consecutive chips of the transmitter-unit identifier). By selectively choosing sampled data for the decoding process, data samples spanning phase transitions between consecutive chips can be avoided, since those samples often exhibit large phase variations due to slow transducer response between chip transitions.

The processing subsystem may adjust only one sample for each chip or symbol of a distinguishing portion of the transmitter-unit identifier; these may be in a common respective position for each chip (e.g., the third sample of each chip). It may determine which samples to adjust by rotating two or more of the reference symbols based on the estimated Doppler-induced phase deviation and then, for each sample index within one symbol, analysing the reference symbols at that sample index, and selecting the sample index that has the highest score from a quality criterion. The samples at this sample index within the symbols of the distinguishing portion may then be adjusted, and used for the decoding and/or cross-correlation operations. The quality criterion may be the average, over the reference symbols, of the in-phase component value at each (rotated) sample. This can avoid samples whose phase and/or amplitude may have been affected by limitations in the transmission or reception components around coding-induced phase jumps. The subsequent cross-correlation may be performed at the chip rate, or the selected samples may be upscaled, e.g. back to the sampling rate.

The processing subsystem may use the cross-correlation to decode the transmitter-unit identifier from the adjusted data samples. Decoding the transmitter-unit identifier using a subset of the sampled data can reduce the complexity of the decoding process. The transmitter-unit identifier may be decoded from the sampled data by cross-correlating the adjusted sampled data with template data for each of the transmitter-unit identifiers. The template data for each transmitter-unit identifier may comprise a set of complex values corresponding to the phase-modulated transmitter-unit identifier, at baseband, at intervals. The processing subsystem may generate correlation magnitude data for each candidate transmitter-unit identifier. The transmitter-unit identifier whose correlation magnitude data has the highest peak value, over all the transmitter-unit identifiers, may be selected as the decoded transmitter-unit identifier. When the transmitter-unit identifiers comprise respective CCK codes, the processing subsystem may comprise a Fast Walsh Transform unit, which may cross-correlate the adjusted sampled data with the template data using a Fast Walsh Transform operation.

In these embodiments, the cross-correlation preferably comprises point-wise multiplication and addition in the time domain.

Rather than adjusting the sampled data, some embodiments may rotate the template data based on the Doppler-induced phase deviation, before cross-correlating the sampled data with the adjusted template data. However, this is less efficient.

A time of arrival may be determined from the cross-correlation of the template data with the sampled data. This may replace, or be used to refine, a time of arrival determined from a sliding energy window.

The time of arrival of the signal may be determined from the temporal position of the peak in the correlation magnitude data for the decoded transmitter-unit identifier. A peak in the correlation magnitude data may be determined at a temporal resolution finer than the sampling rate or the chip rate. A peak detector may use the derivative of the correlation magnitude data over time to determine a position of a peak at a temporal resolution that is finer than the sampling rate. The receiver unit may additionally use the position of the peak to determine a time of arrival of the signal at the receiver.

In a preferred set of embodiments, the peak detector may identify peaks based on a sliding window spanning three successive sample points. At each point in the correlation magnitude data, a gradient before the point and a gradient after the point may be used to identify a peak. These gradients are preferably also used to estimate the location of the peak based on the respective magnitudes of the gradients. A threshold minimum value may also be applied for a peak to be detected. The peak detection may also require the second derivative of the correlation function to satisfy a condition, since this can provide even better separation of peaks from noise.

In one set of embodiments, the processing subsystem determines a Doppler-induced phase deviation by calculating the derivative of the phase of the sampled data, over time, within a distinguishing portion of the transmitter-unit identifier.

This can avoid the need to include reference symbols (such as a preamble) in the transmitter-unit identifier, therefore improving the bandwidth efficiency of the transmission. This can be particularly important for acoustic transmissions where bandwidth is extremely limited and shorter transmissions are beneficial. Shorter transmissions take up less channel capacity, are less prone to multipath interference, and are more likely to experience only constant Doppler shift over their duration (rather than a varying Doppler shift).

The processing subsystem may calculate a phase derivative for one or more, or every, consecutive pair of samples within the transmitter-unit-identifier-bearing portion of the sampled data.

Since Doppler shift can be characterised as a linear deviation in the phase of the transmitted signal over time (assuming constant relative movement of the mobile receiver unit over the duration of the transmission), the phase derivative of consecutive complex IQ data samples of the same chip or symbol in the transmitter-unit identifier can be used to estimate the Doppler induced phase distortion.

Preferably the Doppler-induced phase deviation is determined from phase derivatives calculated from a subset of the samples in the transmitter-unit-identifier-bearing portion. The subset may be obtained by filtering out samples, or derivative values, affected by coding-induced phase shifts in the transmitter-unit identifier. The subset may be obtained by filtering phase derivative values to remove outliers.

The filtering of phase derivative values may be performed by sorting the phase derivative values in ascending order and retaining a central fraction—e.g. values in the interquartile range. This allows large phase derivative values, resulting from consecutive samples over two chips with different coded values, to be filtered out before determination of Doppler-induced phase deviation is performed.

The phase derivatives (optionally after filtering) may be averaged to estimate the rate of Doppler-induced phase deviation over the transmitter-unit-identifier-bearing portion.

The processing subsystem may use the phase derivative values to select samples of the sampled data to adjust and/or to use in decoding the transmitter-unit identifier. The processing subsystem may use the phase derivative values to select samples (e.g. one sample from each chip of the transmitter-unit identifier) that are less affected by coding-induced phase transitions and/or phase variations caused by ambient noise.

In some embodiments, the derivative of the magnitude of the sampled data may be used to select samples of sampled data for which said adjustment based on Doppler induced phase deviation is performed. The derivative of magnitude data may be used in conjunction with the phase derivative values to select samples of sampled data that are substantially unaffected by irregularities in transducer response, such as irregular phase or magnitude values occurring at chip transitions.

Since the magnitude of the signal produced by the transducer may be suppressed during phase changes that occur due to coding across two consecutive chips, the phase values of samples occurring at those instances may be unreliable. Therefore the sampled data may be filtered by removing samples at positions where the derivative of magnitude data is above a threshold.

Optionally, the derivative of phase may be obtained at higher time resolution than the sampled data. This is possible if the sampled data has been down-sampled from initial sampled data. The derivative of phase may then be determined based on the initial sampled data, before down-sampling.

The sampled data, or a subset of the samples, is preferably adjusted by de-rotating the samples based on the Doppler-induced phase deviation. Alternatively, the template data could be rotated, but this is less preferred.

In some embodiments, the processing subsystem may analyse the adjusted sampled data to determine a further estimate of a Doppler-induced phase deviation within the adjusted sampled data. The further estimate of Doppler-induced phase deviation may be used to further adjust the adjusted sampled data, by changing one or more phase shifts within the adjusted sampled data. Performing a second estimation of the Doppler-induced phase deviation, using the adjusted sampled data can be beneficial, since the initial estimation of Doppler-induced phase deviation may be inaccurate due to the noisy nature of time derivatives. Calculating an additional estimate of the remaining Doppler-induced phase deviation, and further adjusting the adjusted sampled data based on the further estimate, can allow more of the Doppler induced phase distortion to be removed. The processing subsystem may calculate the further estimate of Doppler-induced phase deviation by removing one or more coding-induced phase shifts from the adjusted sampled data. It may then characterise a linear phase deviation within the resulting data—e.g., by performing a linear regression operation to determine a gradient. Coding-induced phase components may be removed from the adjusted sampled data by subtracting integer multiples of pi/2 radians from each phase value of the adjusted sampled data until all the phase values are within a range of width pi/2 (e.g., in the range zero to pi/2). This subtraction process should remove all the coding induced phase jumps, leaving only the remaining Doppler-induce phase deviation.

In one set of embodiments, the processing subsystem analyses the sampled data to determine a phase deviation within the transmitter-unit-identifier-bearing portion of the sampled data for each of a plurality of transmitter-unit-identifier templates. In other words, for each of a plurality of transmitter-unit identifiers, the processing subsystem may assume that the particular transmitter-unit identifier has been received, and may estimate a phase deviation, not due to coding, on this assumption. It may then test the quality of the phase deviation estimate for each of the plurality of transmitter-unit identifiers and filter transmitter-unit identifiers that do not meet a quality criterion. This approach may require more processing power, but can be performed without requiring any phase-reference symbols to be included in the transmitter-unit identifier, thereby making efficient use of limited bandwidth.

The phase deviation may be determined by performing a sample-wise multiplication operation on samples in the transmitter-unit-identifier-bearing-portion and on the respective transmitter-unit-identifier template. The multiplication operation may take the complex conjugate of one of the inputs—e.g., of the transmitter-unit-identifier template—before performing sample-wise multiplication. Every sample in the transmitter-unit-identifier-bearing-portion may be multiplied, or only a subset. The sample-wise multiplication operation may be performed once for each template, or it may be performed more than once at different time offsets, e.g., if the temporal position of the transmitter-unit identifier within the sample data is not known precisely. For the correct transmitter-unit identifier, this multiplication operation should remove all the phase shifts due to coding, leaving only (or predominantly) phase deviation due to Doppler-shift. (For the non-matching transmitter-unit identifiers, the phase deviation may be due to a combination of coding shifts and Doppler shift.) The processing subsystem may determine gradient information from the output of the sample-wise multiplication operation—e.g., by linear regression—and may determine the phase deviation from the gradient information. The processing subsystem may filter out one or more transmitter-unit identifiers for which a correlation coefficient, a standard deviation, a variance, or other measure of consistency, of the output of the sample-wise multiplication operation is above a threshold.

For some embodiments, when only one transmitter-unit identifier is left after filtering, then the transmitter-unit identifier has been decoded. When a plurality of transmitter-unit identifiers remain after the filtering, preferably, for each transmitter-unit identifier of the plurality, a respective transmitter-unit-identifier template (i.e., template data) is adjusted so as to change one or more phase shifts within the template by an amount that depends on the respective determined (Doppler-induced) phase deviation for that transmitter-unit identifier. This may be done by rotating the samples according to the respective phase deviation estimate. Each adjusted template may then be cross-correlated with the sampled data, and the template having a highest correlation peak, out of all the adjusted templates, may be identified. In this way, the transmitter-unit identifier may be decoded (as being the identifier corresponding with the identified template).

In some embodiments, initial cross-correlation operations may be performed between the sampled data within the transmitter-unit-identifier-bearing portion and each of a plurality of transmitter-unit-identifier templates—preferably for every transmitter-unit identifier. This may be done before any phase deviation is estimated. Any transmitter-unit-identifier template or templates whose cross-correlation magnitude does not exceed a threshold may be filtered out, before estimating the phase deviation for a remaining plurality of transmitter-unit-identifier templates. This initial coarse filtering can make the decoding process more efficient by removing some templates. It may also provide alignment information for the sample-wise multiplication operations. The cross-correlation operations serves to remove the coding induced phase jumps for one correctly matched transmitter-unit identifier template, at a particular temporal alignment, leading to a correlation magnitude peak at that time position,. However, decoding the transmitted transmitter-unit identifier directly based on this initial correlation data may be reliable due to the potential presence of Doppler shift.

A time of arrival may be determined from an energy window, as described previously. However, it may be determined from said initial cross-correlation operations, or from a subsequent cross-correlation with an adjusted template.

In some embodiments the sample data may be adjusted, based on the respective determined (Doppler-induced) phase deviation, before each cross-correlation with a respective template. This may be done instead of adjusting the templates.

In some embodiments, the respective Doppler-induced phase deviation for each of the plurality of transmitter-unit-identifier templates, may be determined from a subset of the values in the output of the sample-wise multiplication operation—e.g., by discarding some values before performing linear regression. The magnitude of the values in the output of the sample-wise multiplication operation data may be used to determine which values of the output to use for estimating the Doppler-induced phase deviation, for each template. For example, the processing subsystem may select all the even-indexed values of the output or all the odd-indexed value, depending on which subset of the values has the higher value when summed. This can ensure that only those samples that are aligned accurately with the transmitter-unit-identifier template are used.

In some embodiments, the processing subsystem may remove values in the output of the sample-wise multiplication operation that correspond to predetermined sample index positions before determining the respective Doppler induced phase deviation. This can allow values at positions known to be likely to be affected by coding-induced phase transitions to be excluded, in order to improve the quality of the results. The predetermined sample index positions may depend on the particular transmitter-unit-identifier template, because the positions of phase transitions will differ between the templates due to the different underlying binary values of each.

While the Doppler-induced phase deviation has generally been described as linear herein (on the assumption that any relative movement of the mobile unit will be constant over the duration of the transmitter-unit-identifier transmission), it will be appreciated that, in some embodiments, a non-linear Doppler-induced phase deviation may be determined and used to adjust the template data or sampled data. This may be relevant where, for instance, the mobile receiver unit is known to be accelerating or following a non-linear trajectory. In such cases, linear regression may be replaced by quadratic regression, exponential regression, or any other appropriate analysis.

Features of any aspect or embodiment described herein may, wherever appropriate, be applied to any other aspect or embodiment described herein. Where reference is made to different embodiments or sets of embodiments, it should be understood that these are not necessarily distinct but may overlap.

Certain preferred embodiments of the invention will now be described, by way of example only, with reference to the accompanying drawings, in which:

FIG. 9 is a flow chart showing operations of a non-coherent CCK code decision module used in a second embodiment of the positioning system.

FIG. 1 shows part of a positioning system that may be used in, for example, a shopping mall in order to determine the locations of shoppers within the shopping mall. Of course, this is just one example environment, and the positioning system could also be used in warehouses, hospitals, domestic homes, vehicles, etc.

Figure 1:
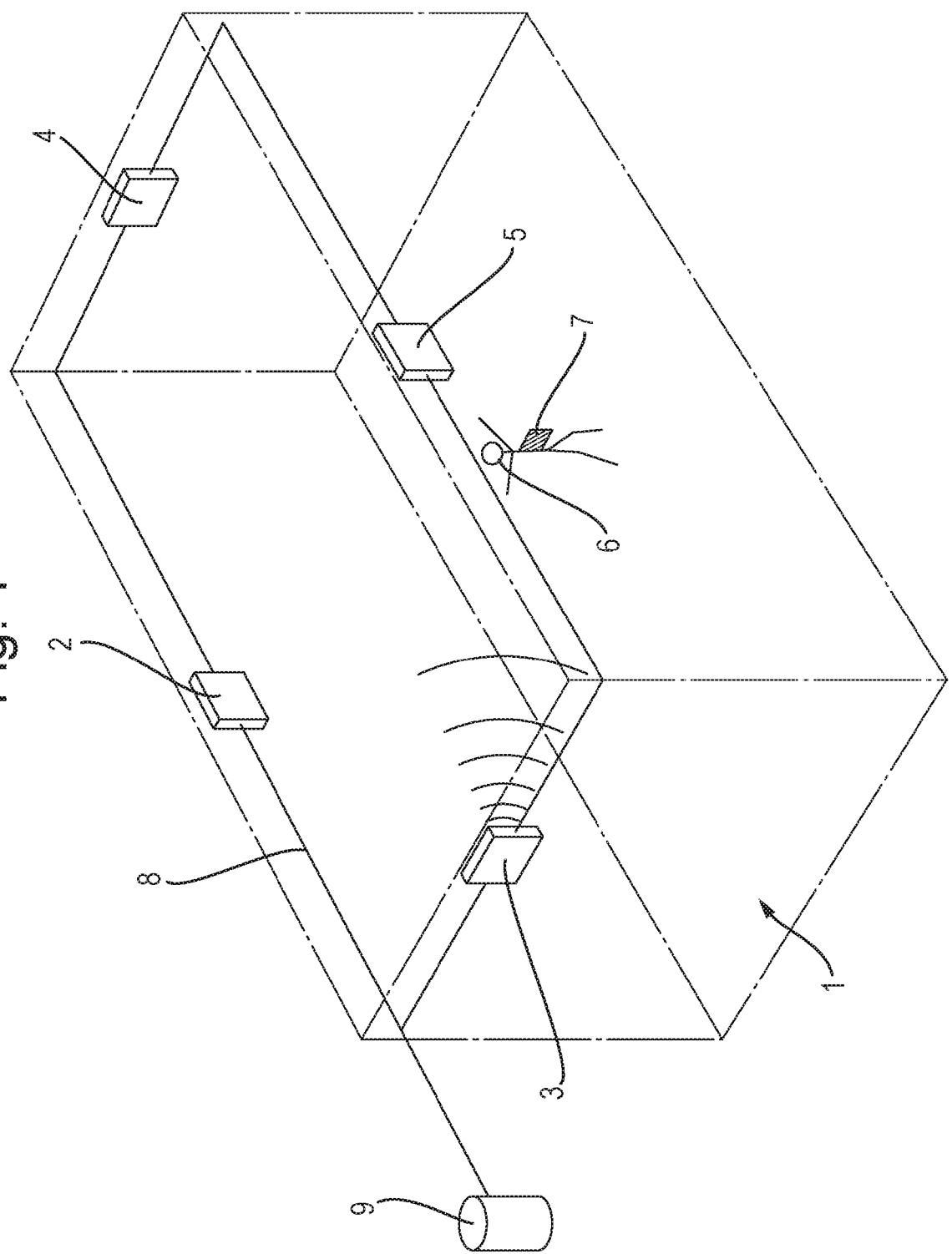
FIG. 1 is a perspective diagram of a positioning system embodying the invention.

FIG. 1 shows a room 1, to the walls of which are affixed four static transmitter units 2, 3, 4, 5. A person 6 in the room is carrying a mobile receiver unit 7. A network cable 8 connects each transmitter unit 2, 3, 4, 5 to a server 9, which is typically located in another room or in another building. These components cooperate to provide a positioning system, capable of estimating the three-dimensional location of the mobile receiver unit 7 within the room 1. In practice, the system may have further similar transmitter units, installed throughout a building or series of rooms, and a plurality of similar mobile receiver units attached to, or incorporated into, people, animals, vehicles, robots, stock, equipment, etc.

Figure 2:
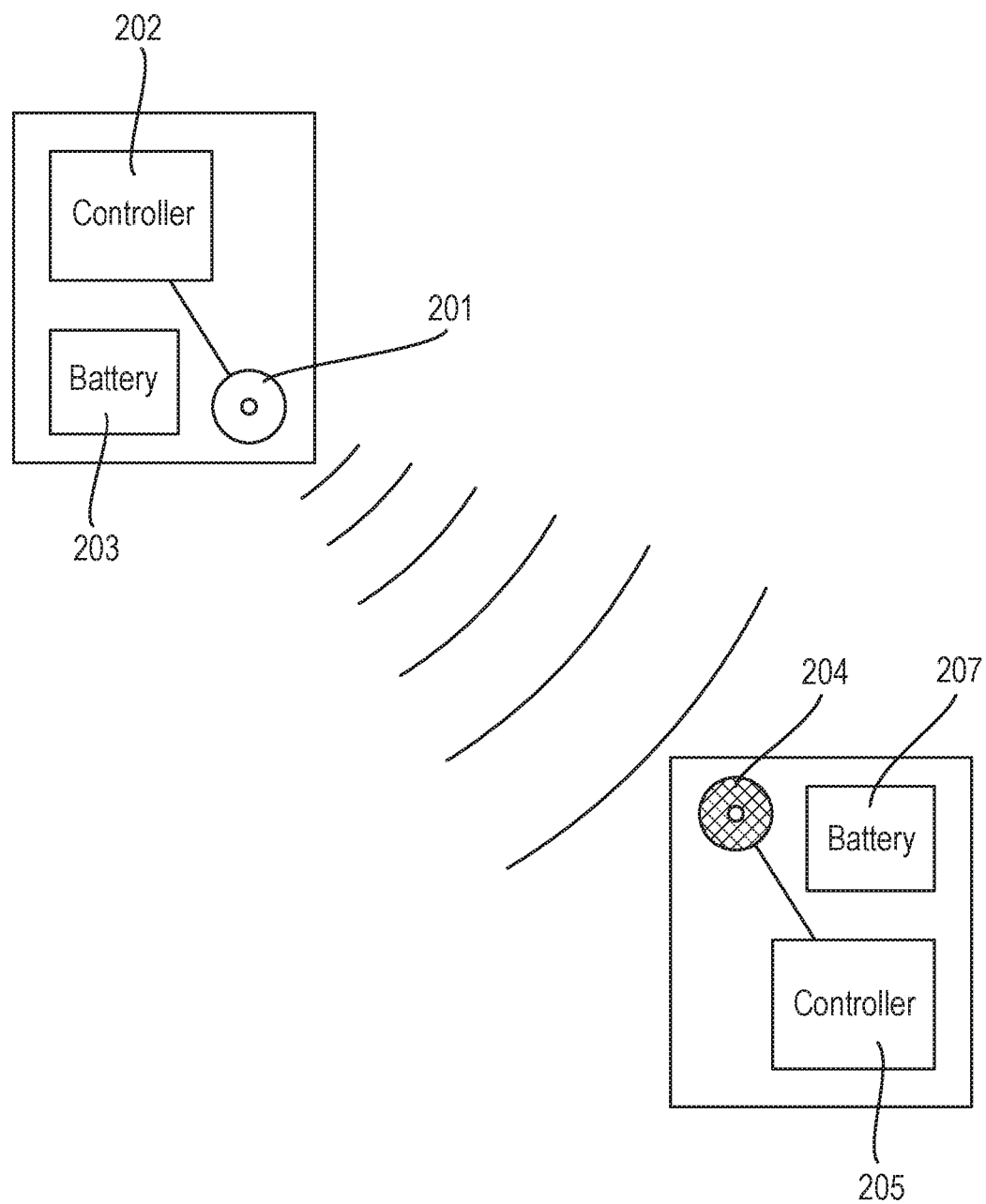
FIG. 2 is a schematic drawing of a static transmitter unit and a mobile receiver unit for use in the positioning system.

FIG. 2 shows a representative one of the transmitter units 2, 3, 4, 5, and a mobile receiver unit 7. Each transmitter unit 2, 3, 4, 5 has a respective ultrasonic sounder 201, a controller 202 for causing the ultrasound transducer 201 to transmit ultrasonic signals, and battery 203 for supplying power to the transmitter unit. The mobile receiver unit 7 has a microphone 204 capable of receiving ultrasonic signals from the transmitter units 2, 3, 4, 5, a controller 205 for sampling and processing the received signals, and a battery 207 for powering the mobile receiver unit 7. The transmitter units 2, 3, 4, 5 and mobile receiver unit 7 may have further standard electronic components such as radio transceivers, wired-network interfaces, display screens, buttons, etc.

The controllers 202, 205 can include one or more processors, DSPs, ASICs and/or FPGAs. They can include memory for storing data and/or for storing software instructions to be executed by a processor or DSP. They can include any other appropriate analogue or digital components, including oscillators, ADCs, DACs, RAM, flash memory, etc.

Although the transmitter units 2, 3, 4, 5 are here shown as being static, it will be appreciated that, in other embodiments, they may be mobile—e.g., one or more of the transmitter units could be a mobile telephone or device in the possession of a respective user.

In use, the server 9 causes each transmitter unit 2, 3, 4, 5 to transmit, at intervals, a signature unique to that transmitter unit. (It will be understand that, in a large deployment, the signatures may be unique only within a locality; if signatures are reused across a system, additional data is preferably used to differentiate between identical signatures.) Each signature is encoded on an ultrasonic carrier—e.g., a 20 kHz or 40 kHz carrier—and comprises a respective one of a set of sixty-four QPSK-encoded Complementary-Code-Keying (CCK) codes. The signature may be contained in a longer transmission that also has one or more additional elements, such as a preamble and/or data content, preferably also QPSK-encoded on the same ultrasonic carrier.

Each CCK code consists of eight complex chips, each complex chip being encoded as one of four possible QPSK symbols.

CCK codes are known from spread-spectrum radio communication systems. When used in a coherent radio system, an additional two bits of information can be encoded in the quadrature phase of each CCK code, enabling eight bits ($d_7 \ldots d_0$) of data to be encoded by each code (i.e., 256 different chipping sequences), where $d_0$ is the least significant bit and the first in time. In the present ultrasound system, however, the mobile receiver unit 7 does not have a phase reference for the received CCK code, which limits the set of unique signatures to sixty-four.

Each of the sixty-four possible signatures corresponds to a different eight-bit string, $d_0, \ldots, d_7$, which defines a respective CCK code, $C$, as follows:

$$C = (c_7, c_6, c_5, c_4, c_3, c_2, c_2, c_0)$$
$$= (e^{j(\phi_1)}, e^{-(\phi_1+\phi_2)}, e^{j(\phi_1+\phi_3)}, e^{j(\phi_1+\phi_2+\phi_3)},$$
$$-e^{j(\phi_1+\phi_4)}, e^{j(\phi_1+\phi_2+\phi_4)}, e^{j(\phi_1+\phi_3+\phi_4)}, e^{j(\phi_1+\phi_2+\phi_3+\phi_4)})$$

where the phase parameters $\phi_1 \ldots \phi_4$ are obtained from the data bits using a scheme: $(d_1, d_0) \rightarrow \phi_1$, $(d_3, d_2) \rightarrow \phi_2$, $(d_5, d_4) \rightarrow \phi_3$, $(d_7, d_6) \rightarrow \phi_4$.

Each chip is a complex QPSK bit-pair. The codes are transmitted most-significant-bit first, such that the chip $e^{j(\phi_1+\phi_2+\phi_3+\phi_4)}$ is transmitted first.

In this example embodiment, the CCK chip rate is 500 chips/second, meaning that each CCK code has a duration of 16 ms. Each CCK code is modulated on a 20 kHz acoustic carrier signal and transmitted at intervals by a respective transmitter unit 2, 3, 4, 5. Of course, other rates are also possible.

The acoustic sampling rate at the mobile receiver unit 7 is, in this example, 2000 samples/second, meaning that each chip is four-times over-sampled. The positioning system has a basic time resolution of 2 milliseconds which corresponds to a spatial resolution of approximately 68 cm (=0.002 seconds×speed-of-sound in air, 340 m/s). However, using the techniques described below, a much finer temporal resolution can be achieved.

Of course, other chip rates and sampling rates may be used in other embodiments.

Especially in embodiments having more than sixty-four transmitter units, it may be desirable to transmit additional information that allows the mobile receiver unit 7 to distinguish between identical signatures from different transmitter units 2, 3, 4, 5. For example, a short-range RF signal, or additional data encoded in an ultrasound signal transmitted by one or more of the transmitter units 2, 3, 4, 5, can allow CCK codes to be reused in different locations across a site without ambiguity.

The mobile receiver unit 7 detects and demodulates received ultrasound signals to try to identify CCK codes that have been transmitted by transmitter units 2, 3, 4, 5 within audible range of the receiver unit 7.

For each CCK code that is received and demodulated, an identity of a respective transmitter unit 2, 3, 4, 5 that sent the code can be determined.

The receiver unit 7 is preferably synchronised with the transmitter units 2, 3, 4, 5 and can therefore also calculate a time of flight (TOF) for every signature it receives. By combining three or more TOF measurements from known transmitter locations, the position of the mobile receiver unit 7 can be determined using known principles of trilateration or multilateration.

If the receiver unit 7 is not synchronised, a time difference of flight (TDOF) method can still be used to determine its position; however, in this case, four or more transmitter locations are required.

The position determination calculations may be performed on the mobile receiver unit 7, or the receiver unit 7 may send information about the received signals, including timing or distance information, to the server 9, which can perform part or all of the calculations.

Doppler shift occurs whenever the mobile receiver unit 7 is moving towards or away from one of the transmitters units 2, 3, 4, 5.

The change in frequency due to Doppler shift is given by $$\Delta f = \frac{v}{c} f,$$

where v is the component of velocity of the mobile receiver unit 7 in a direction towards or away from the transmitter unit 2, 3, 4, 5, c is the velocity of the waves in the air, and f is the frequency of the signal emitted from the transmitter unit. A positive v represents movement of the mobile receiver unit 7 towards a transmitter unit 2, 3, 4, 5.

The relatively low value of speed of sound in air (approximately 340 m/s) causes even low speed movements to create relatively large frequency shifts in the transmitted signal. As an example, if the person 6 carrying the mobile receiver unit 7 walks at a speed of 1.5 metres per second towards one of the transmitter units 2, 3, 4, 5, an acoustic signal at 20 kHz will experience a frequency rise of around 90 Hz.

The QPSK decoder must be able to distinguish between motion-induced phase changes and phase changes due to CCK coding. At a carrier frequency of 20 kHz, the wavelength is 1.7 cm. Since the minimum phase change due to QPSK encoding is ninety degrees, the QPSK decoder cannot reliably distinguish between a phase shift due to the QPSK encoding and a Doppler-induced phase shift due to a change in path length of 4 mm of more (corresponding to a quarter of a wavelength) as the mobile receiver unit 7 moves towards or away from the transmitter.

The system thus uses Doppler-shift compensation to improve the accuracy of decoding transmitted CCK codes and the accuracy of the positioning algorithm.

The Doppler-shift compensation mechanism compensates for Doppler shift to allow for accurate decoding of the received CCK signature, and determination of the arrival time of the CCK signature at the mobile receiver unit 7. However, it may also output a measurement of the Doppler shift, which can be used to determine information about the speed or velocity of the mobile receiver unit 7. This additional information may be used by the server 9 or mobile receiver unit 7 to improve the position estimation, or tracking, of the receiver unit 7.

Since Doppler shift changes the phase of the received signals, the mobile receiver unit 7 cannot reliably recover the carrier phase and use coherent detection methods. Therefore, asynchronous detection methods are used.

Several alternative asynchronous detection methods, incorporating Doppler compensation, are explained in detail in the example embodiments below. Each method is used in a respective embodiment and may be implemented in the mobile receiver unit 7 and/or server 9. Although processing steps are described herein as being carried out by the receiver unit 7, it should be understood that, in some embodiments, these steps may instead be carried out wholly or partially by the server 9, where appropriate. Intermediate results may be communicated between the receiver unit 7 and the server 9 by any appropriate means, such as a radio link.

Figure 3:
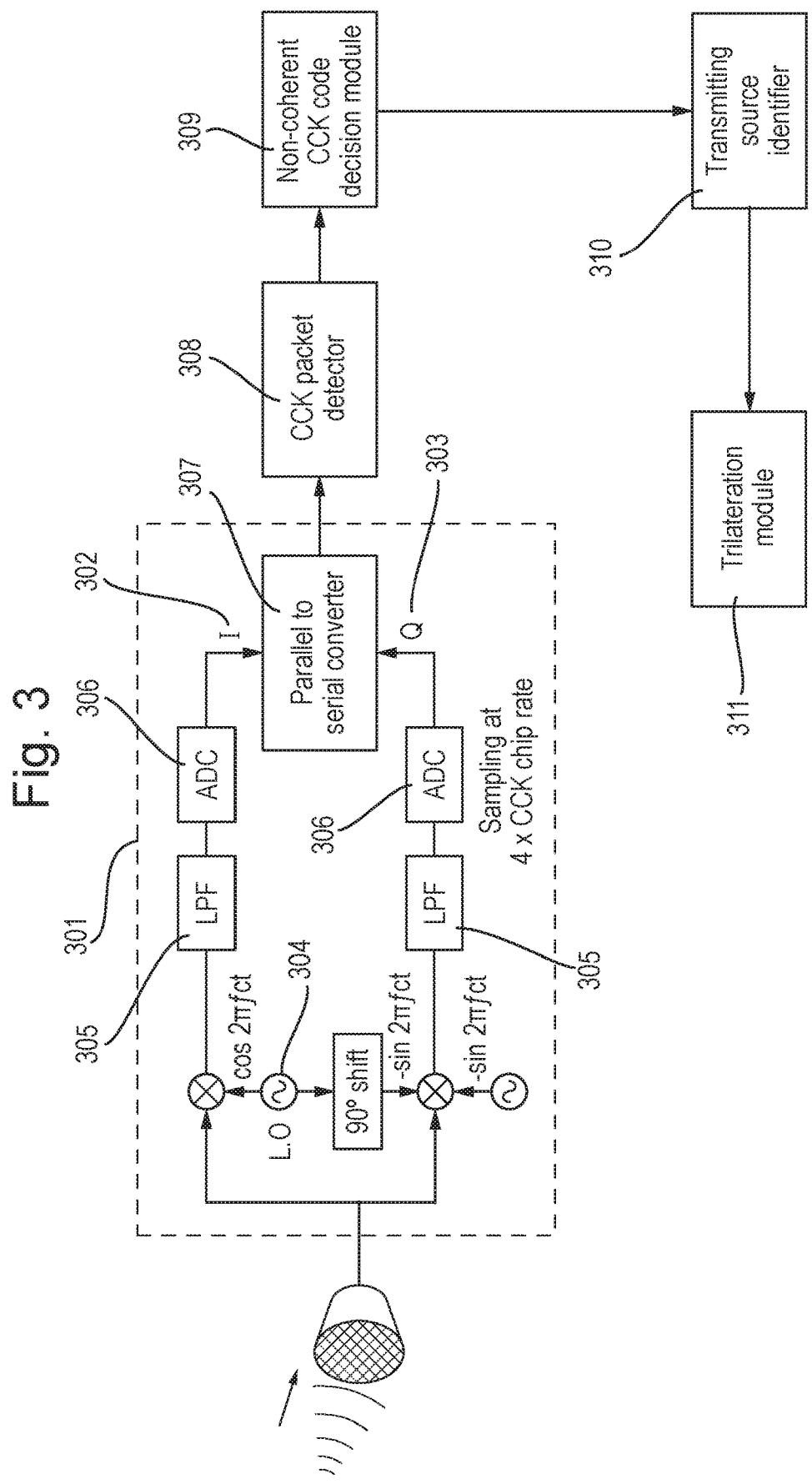
FIG. 3 is a schematic diagram showing functional units in the mobile receiver unit.

FIG. 3 illustrates the general structure of the mobile receiver unit 7, which is common to all the Doppler compensation methods described below.

Received ultrasound energy is first passed through a quadrature demodulator 301 which down-converts the ultrasound signal to a baseband signal and obtains in-phase 302 and quadrature phase 303 samples.

The down-conversion is achieved by frequency-mixing the received ultrasound energy with two copies of a locally-generated 20 kHz signal from a local oscillator 304, one ninety degrees delayed with respect to the other. The two frequency-mixed signals are passed through respective low pass filters 305, which remove the high-frequency components resulting from the mixing operation.

The resulting in-phase 302 and quadrature 303 components are passed through respective analogue to digital converters 306 for sampling (typically at 2 kHz, corresponding to four times the chip rate of the transmitted signals). The in-phase and quadrature samples are then combined at 307 to give a sequence of complex IQ data samples.

The complex IQ data samples are fed into a CCK packet detector 308 sample by sample. The CCK packet detector 308 detects when and where a CCK code is likely to be present in the received signal.

The CCK packet detector 308 then outputs the relevant samples to a non-coherent CCK code decision module 309. The CCK packet detector 308 may also pass a time-of-arrival estimate to other modules within the receiver unit 7 and/or server 9. The CCK code decision module 309 identifies which of the sixty-four CCK codes best matches the received CCK code. Based on the knowledge of this signature, the transmitting-source identifier module 310 determines the identity of the transmitter unit 2, 3, 4, 5 that transmitted the received signal. The CCK code decision module 309 may also determine a more accurate time-of-arrival estimate for the CCK code, which it may pass to other modules, such as the trilateration module 311.

A trilateration module 311 receives this identity, as well as time-of-arrival information from the CCK packet detector 308 and/or CCK code decision module 309. It can use the timing information to determine a position of the mobile receiver unit 7 in the room—e.g. by combining such information in respect of three or more static transmitter units 2, 3, 4, 5 in a sphere-intersection or parabaloid-intersection calculation. Of course, these calculations may, in other embodiments, be carried out away from the mobile receiver unit 7, such as on the server 9.

The detailed operations carried out by the CCK packet detector 308, the CCK code decision module 309, and the transmitting-source identifier module 310 vary between embodiments, depending on what Doppler-compensation method is used. Further details of various different exemplary methods will now be provided.

Method I

Figure 4:
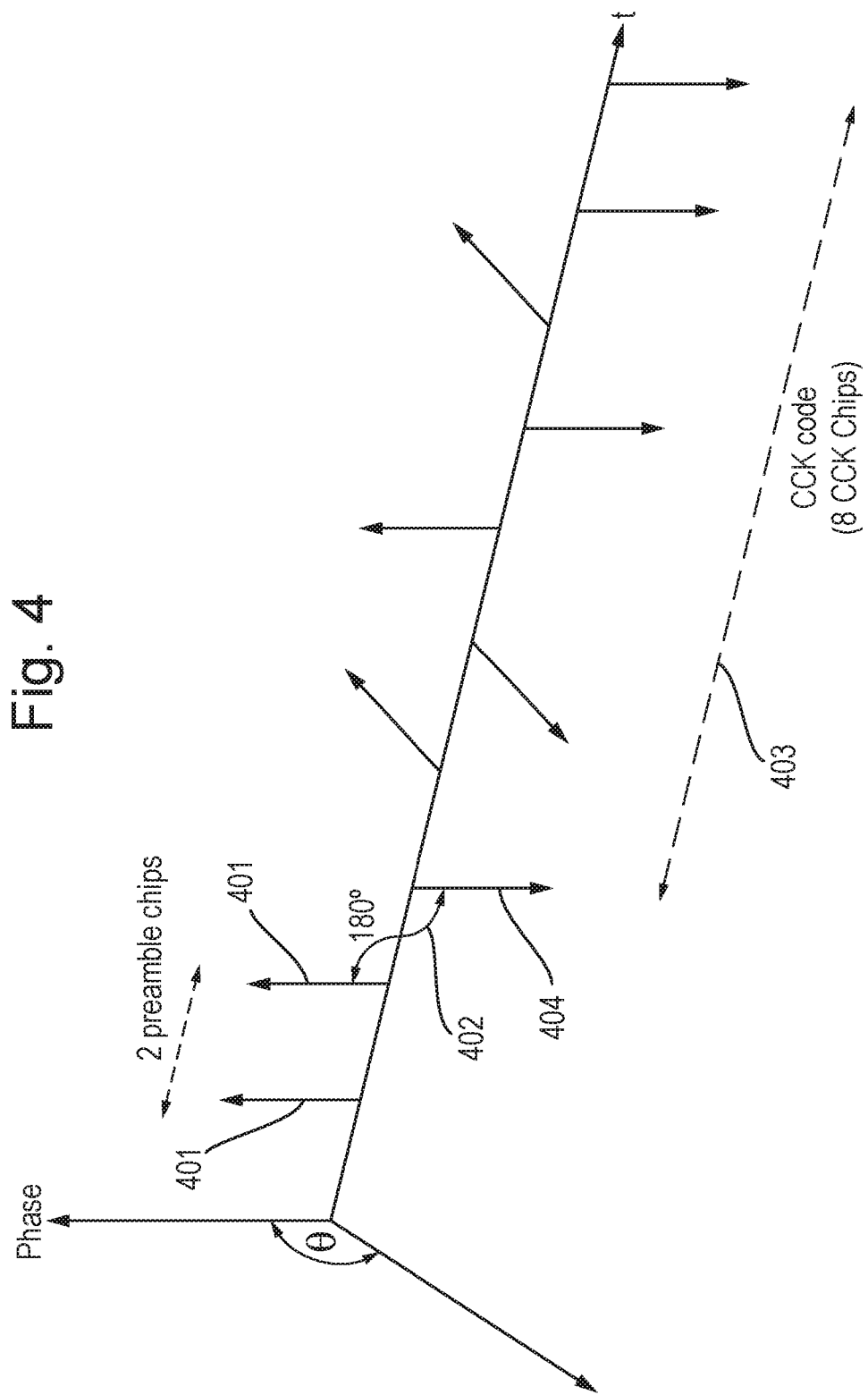
FIG. 4 is a phasor diagram of a signature transmitted by the static transmitter unit in some embodiments.

In one embodiment, illustrated in FIG. 4, each signature-bearing transmission starts with a preamble of two QPSK chips 401, with no phase shift between the two chips. The CCK code follows immediately after the preamble. The first complex chip of the CCK code follows the preamble at a 180° phase angle 402 from the two preamble chips. Note that, because the mobile receiver 7 has no prior phase reference, the receiver 7 cannot decode any data from the two preamble chips and the first complex chip of the CCK code; however, they establish a phase reference for demodulating the remainder of the transmission. (For the reason, the first chip of the CCK code can equally be considered part of the preamble, with the first two chips being first and second reference symbols, as described above, and the first CCK code chip being a third reference symbol.)

The mobile receiver unit 7 uses the preamble chips to characterise any Doppler-shift-induced phase distortion in the received signal. This characterisation is subsequently used to correct the phase values of the CCK chips of the received CCK code 403.

The 180° phase difference between the preamble chips and the first chip of the CCK code allows the CCK packet detector 308 to determine the start 404 of the CCK code 403 with high temporal precision.

Figure 5:
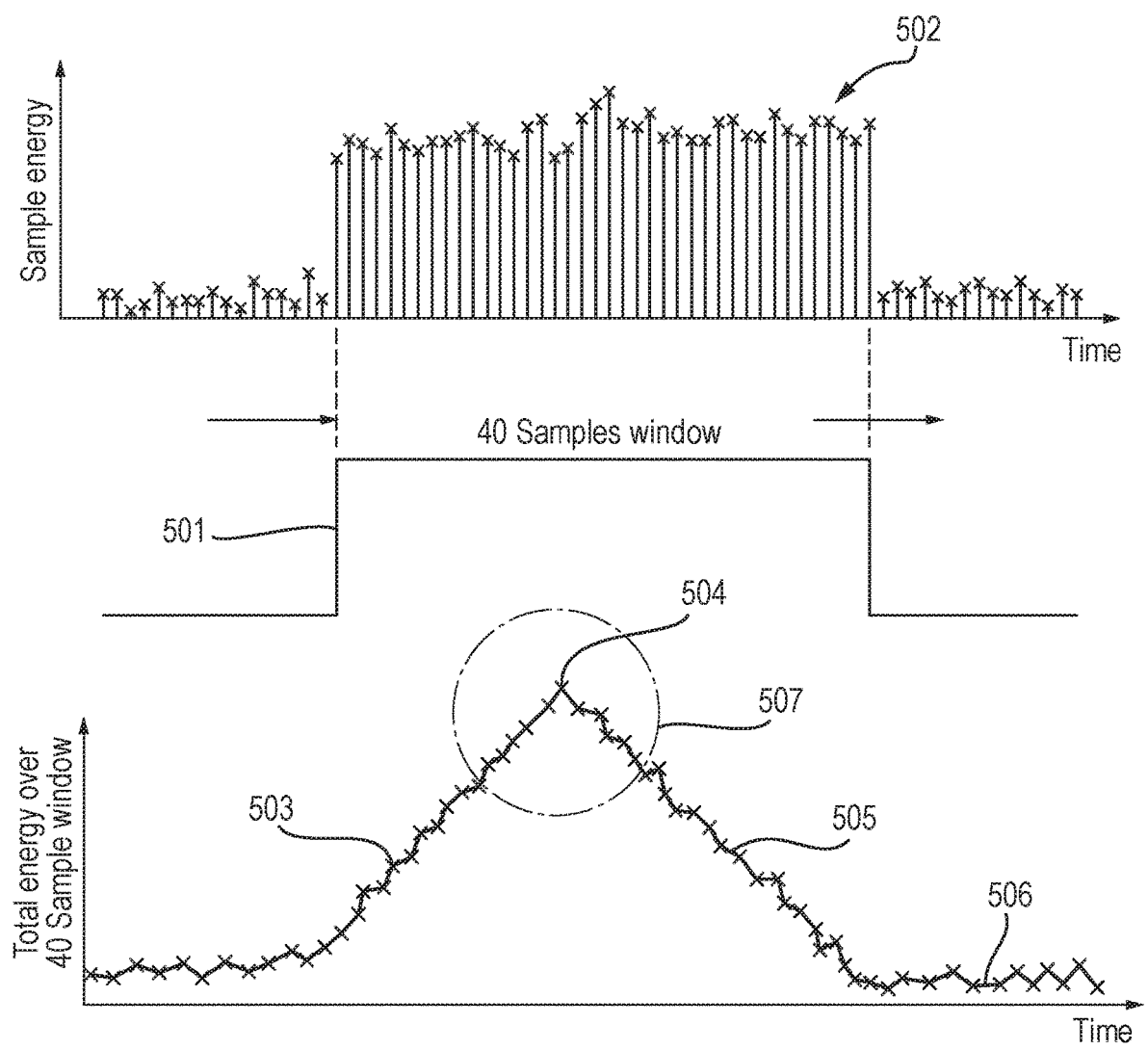
FIG. 5 shows graphs illustrating the operation of a CCK packet detector of the positioning system in some embodiments.

FIG. 5 illustrates, in more detail, how the CCK packet detector 308 operates, when implementing this first method of Doppler compensation.

A sliding energy detection window 501 of forty samples in length is applied to a buffer holding the incoming complex samples 502. (Forty samples is equivalent to the length of the transmitted signal at a four-times oversampling rate, as explained in more detail below.) The CCK packet detector 308 calculates the total energy over a rolling time frame of forty samples by summing the sample values within the window. An updated total energy value is calculated each time a new sample arrives. These total-energy values are plotted in the bottom graph of FIG. 5. The total energy is expected to be at its highest when the window is fully aligned with samples spanning a complete signal from one of the transmitter units 2, 3, 4 or 5 made up of eight preamble samples and thirty-two CCK samples. This is because the level of the preamble samples and CCK code samples is expected to be higher than the level of the ambient noise.

Assuming a relatively low background noise level, as the signal containing the preamble samples and the CCK code samples starts falling into the forty sample energy detection window 501, the total energy measured over the forty samples will rise 503, and eventually reach a peak 504 as all of the preamble samples and the CCK samples fall within the energy detection window 501. This is shown in FIG. 5. The total energy will then start to fall 505 as the CCK code samples are shifted out of the energy detection window 501 and later-received samples containing only noise are shifted into the energy detection window 501. When all of the preamble samples and CCK samples have been shifted out of the energy detection window 501, the total energy will return to a baseline energy level 506 reflective of the ambient noise level.

The CCK packet detector 308 outputs a positive detection when the total energy in the forty-sample window exceeds a threshold level.

In order to determine an initial estimate of the time of arrival at a temporal resolution that is finer than the sample interval, a three-point peak detection method can be used to locate the total-energy peak 504, as shown in FIG. 5. This sub-resolution initial estimate may be refined later, as described below, but it may be useful in its own right—e.g., for implementing a low-power movement detector which compares successive time-of-arrival estimates to detect changes above a threshold level and only continues with further processing of the samples when movement is detected. This can allow the system to save power when the mobile receiver unit 7 is stationary.

Figure 6:
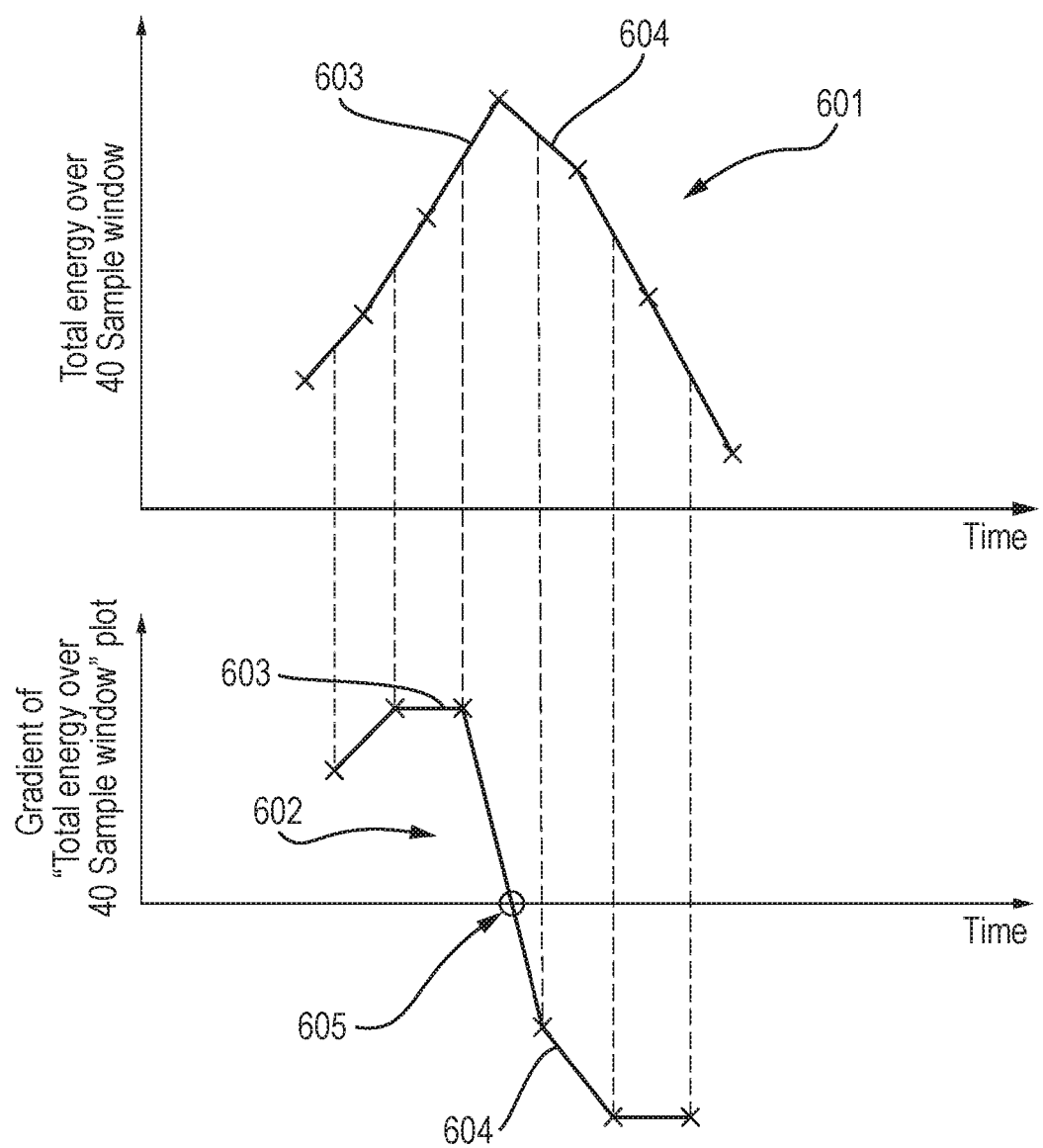
FIG. 6 shows graphs illustrating a three point peak detection algorithm used in the positioning system in some embodiments.

FIG. 6 illustrates this method. The upper graph 601 in FIG. 6 shows a close-up of a portion 507 of the total energy plot from FIG. 5, surrounding the peak value 504. The three peak detector uses a sliding window spanning three successive sample points. For each point in the total energy data, a gradient 603 immediately before the point and a gradient 604 immediately after the point are calculated. These gradients are used to identify a peak, and also to estimate the precise location of the peak based on the respective magnitude of the gradients. The lower graph 602 in FIG. 6 plots the gradients between each pair of points in the total energy data. The temporal position of a zero-crossing point 605 provides a time estimate for the corresponding peak 504 in the total-energy data with sub-resolution accuracy. This time estimate can be used as an estimate of the time of arrival for the ultrasound transmission from the relevant location transmitter, or can be used to calculate such an estimate (e.g., an arrival time for the start or the end of the signature transmission, or of the CCK code portion of the transmission).

An accurate peak location estimate can be obtained using the following three-peak detection algorithm, for a sample period of $t_s$. (e.g., 0.0005 seconds):

1. calculate the gradients either side of each total-energy data point x(t), namely $a = x(t+t_s) - x(t), \ b = x(t) - x(t-t_s);$ 2. detect the presence of a peak near x(t) if a<0 AND b>0 AND x(t) exceeds a suitable threshold; and
3. calculate the precise timing of the peak as:

$$t + \frac{a+b}{2(b-a)} t_s$$

In some other embodiments, described below, there are no preamble chips. In this case, the sliding energy detection window used by the CCK packet detector 308 simply needs to be long enough to detect the CCK code samples (unless there is any additional data after the CCK code, in which case a window of appropriate length would be used). In such embodiments, the CCK packet detector 308 may use a window of thirty-two samples, rather than forty, to detect a CCK code sampled at four times the chip rate.

In a variant embodiment, the CCK packet detector 308 may use an energy window that masks every fourth sample of each CCK chip—i.e. that ignores the signal magnitude in eight periods, which can correspond respectively to the last sample of each chip, when the energy window is fully aligned with an incoming code. This may improve the accuracy of the energy window match, because the transmitted CCK code may potentially shift phase every chip (i.e., every four samples) and during this phase shift the magnitude of the signal can be suppressed, based on the response time of the transmitting transducer 201. The remaining three samples in each chip should have near equal magnitude, within the chip, and across all the chips. By masking periods that may contain a phase transition, the timing accuracy can be improved.

The CCK packet detector 308 then outputs, to the non-coherent CCK code decision module 309, the forty samples that fell in the time window corresponding to the total-energy peak. It can also pass time-of-arrival information to the trilateration module 311.

Figure 7:
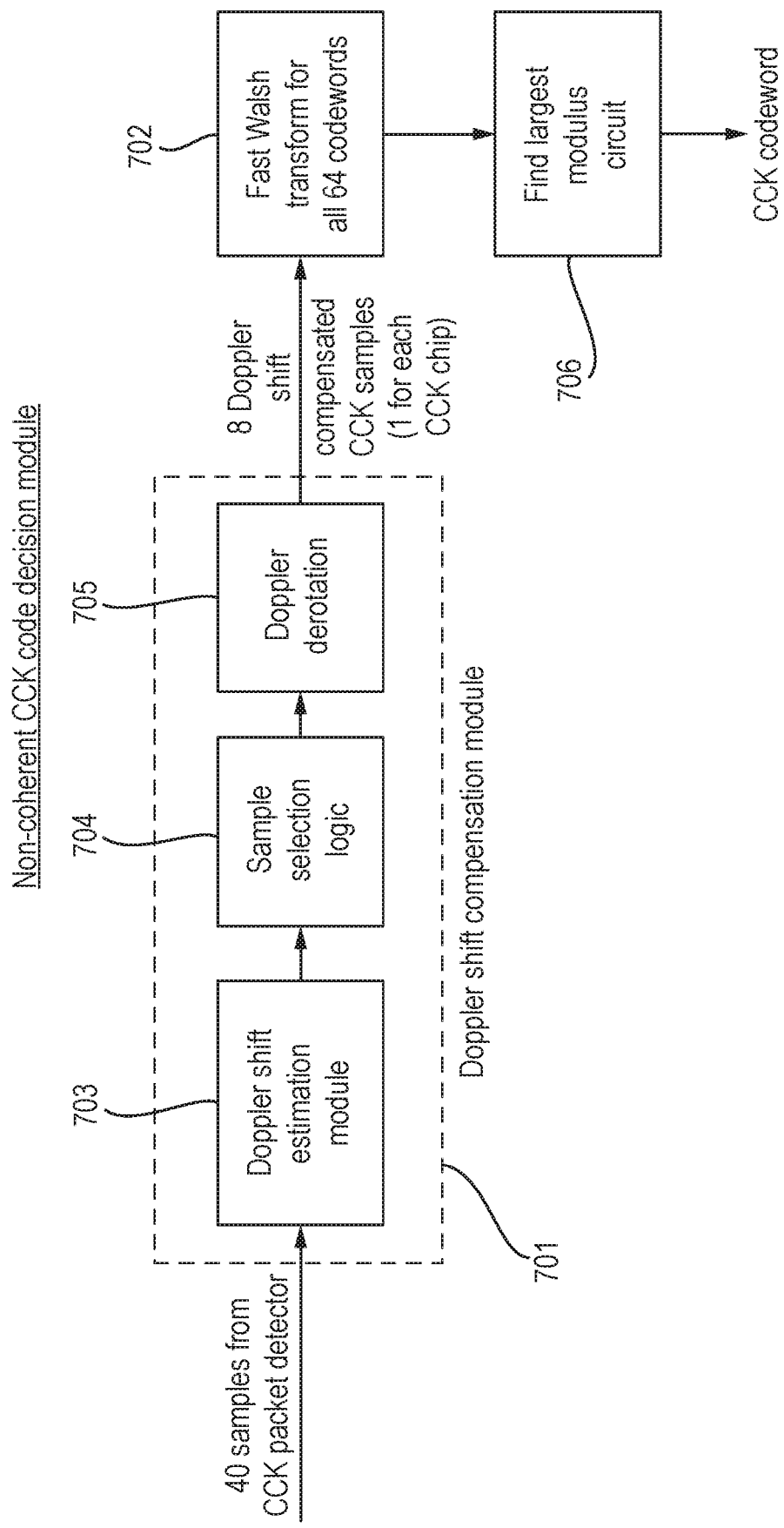
FIG. 7 is a schematic diagram showing functional units of a non-coherent CCK code decision module used in a first embodiment of the positioning system.

FIG. 7 shows the detailed structure of the non-coherent CCK code decision module 309 according to this first compensation method. The CCK code decision module 309 here uses a Doppler shift compensation module 701 and a modified fast Walsh transform operation block 702 to identify a received CCK code.

The Doppler shift compensation module 701 includes a Doppler shift estimation module 703, sample selection logic 704, and a Doppler de-rotation module 705.

The Doppler shift estimation module 703 uses the samples of the two preamble chips 401 and the first chip of the CCK code to calculate a rate of phase distortion (due to Doppler shift) over the twelve samples containing the preamble and the first chip. The first of the twelve samples is not used, because the ultrasound transducer 201 transmitting the ultrasound signal may still be in the process of ramping up at the start of the transmission. The eighth and ninth samples are also ignored, since these samples span a 180° phase transition 402 between the preamble and the first sample of the CCK code 403 and are therefore quite likely to be at transitional phases, because the transmitting and receiving transducers cannot implement instantaneous phase changes. In some embodiments, the twelfth sample might also be ignored, as this could be in a transition state if the second CCK chip is not the same as the first CCK chip.

The Doppler shift estimation module 703 multiplies the second, third and fourth samples of the first preamble chip by the complex conjugate of the known, fixed value of first transmitted preamble chip. The Doppler shift compensation module 703 additionally multiples the first, second and third samples of the second preamble chip by the complex conjugate of the second preamble chip and multiples the second, third and fourth chips of the first CCK chip by the complex conjugate of the transmitted first CCK chip (which has a fixed 180° phase relationship to the preamble, for all 64 CCK codes). The process of complex conjugate-multiplication by known chip values serves to remove, from these samples, the phase component due to the QPSK symbol modulation, so that any changes across the remaining the phase components are due to Doppler shift.

After multiplying the six preamble samples and the three samples of the first CCK code by the complex conjugate of their transmitted values, the Doppler shift estimation module 703 performs phase unwrapping on each complex conjugate-multiplied sample to characterise the linear phase distortion trend from discontinuous phase space ($-\pi$ to $-\pi$), to continuous phase. The phase unwrap can be performed by adding $2\pi$ radians to samples that experience a phase dropoff of approximately $2\pi$ radians due to phase wrapping. The resulting phase components characterise the linear phase changes over time due to Doppler shift.

Using the phase values of these initial samples, the Doppler shift estimation module 703 estimates the Doppler shift frequency $\omega_d$ in the received signal based on the linear phase distortion trend over time over the first twelve samples (three of which are disregarded, as already explained). The rate of change of the linear phase distortion over multiple samples represents the Doppler velocity in radians per sample. For example, if the change in phase over the second to twelfth samples is $\phi_p$ (i.e., an eleven-sample time window), then the Doppler shift estimate is given by $\phi_p/11$ radians per sample.

Assuming the Doppler shift is constant throughout the period of transmission of the CCK code, the phase distortion due to Doppler shift, calculated over the two preamble chips and the first CCK chip can be extrapolated linearly and used to correct the whole CCK code by derotating the samples at a corresponding rate.

Since the ultrasound transducer 201 transmitting the CCK code, and the microphone 204 receiving it, may both be slow to respond to phase transitions between consecutive CCK chips, the Doppler compensation module 701 uses sample selection logic 704 to intelligently select one of the four sample positions, across all of the chips, that is most likely to have a stable phase value that is close to the known modulated phase of the CCK chip at the transmitter unit. For example, the third sample of every chip might be selected. This selected sample is taken to be representative of the whole chip, and is used in the de-rotation operation (i.e., the sample set is decimated by a factor of four).

The sample selection logic 704 first performs Doppler compensation of the first twelve samples of the received signal (spanning the two preamble chips and the first CCK chip) using the Doppler velocity estimate obtained from the Doppler shift estimation module 703. The sample selection logic then calculates an average, over the three chips, of the in-phase component of the Doppler-corrected samples, for each of the first, second, third and fourth sample positions within the chips. The sample position having the highest average is selected as the optimum sample position to use over the whole CCK code. The sample at the optimum sample position in each CCK chip (e.g., the third sample of every chip) is therefore selected as input to the Doppler de-rotation module 705.

The Doppler de-rotation module 705 then uses the Doppler shift estimate to compensate the selected eight samples spanning the whole CCK code for Doppler-induced phase distortion. This phase compensation is achieved by rotating the selected samples by a phase value that corresponds to the projected phase distortion due to Doppler shift at the time instance of the respective sample.

The Doppler compensated samples can be expressed as $$\text{Compensated\_CCK\_samples}[n] = \text{Received\_CCK\_samples}[n] \times e^{-i\omega_d n}$$

where n is the sample position index of each of the eight samples selected by the sample selection logic (e.g., indices 3, 7, 11, 15, 19, etc.) and $\omega_d$ is the Doppler velocity in radians per sample.

The embodiments described above are further illustrated below using a numerical example. In this example, the forty samples containing eight preambles samples and thirty-two CCK code samples start at sample index zero and end at sample index thirty nine. Assuming the change in phase between the second sample of the first preamble chip and the third sample of the second preamble chip is ϕ in radians, the Doppler velocity measured using the two preamble chips is ϕ/6 radians per sample. The extrapolated phase change due to Doppler shift at sample index n, where n is between eight and thirty nine, is given by ϕ/6×n radians. The Doppler compensation module rotates each of eight samples, selected by the sample selection logic 704, by a phase that corresponds to its sample index.

The eight Doppler compensated CCK code samples are then passed to the modified Fast Walsh Transform operation block 702 for decoding. Fast Walsh Transform processing techniques are known from certain radio receivers that implement the IEEE 802.11b specification and may be used here, with appropriate modifications. The Fast Walsh Transform block 702 effectively simultaneously cross-correlates all sixty-four possible CCK codes with the adjusted received signal. The sixty-four cross-correlation outputs are input to a largest-modulus picker-circuit 706, which determines which of the sixty-four CCK codes (and therefore which signature) has been received, by finding the largest cross-correlation magnitude.

Based on the identity of the received signature, the transmitting-source identifier module 310 of the mobile receiver unit 7 determines the identity of the transmitter unit 2, 3, 4, 5 that transmitted the received signal. In some cases this may involve the use of additional information to resolve potential ambiguity, e.g. if the same signature is used more than once across an installation.

Once a transmitted CCK code has been successfully identified, some embodiments may then refine the initial time-of-arrival estimate obtained by the CCK packet detector 308.

To do this, thirty-six stored samples of the received signal are de-rotated, being the thirty-two samples detected by the CCK packet detector 308 plus two earlier samples and two later samples. A cross-correlation is then performed by calculating the inner product of the de-rotated thirty-six samples and the thirty-two-sample CCK code template at four time positions: the two (integer-valued) sample positions before the (typically non-integer) sub-sample-resolution time-of-arrival identified by the CCK packet detector 308, and the two (integer-valued) sample positions after this time-of-arrival. (Alternatively, the known preamble chips may also be included, with the number of samples of the received signal being increased accordingly, and the CCK code template having the preamble prepended.)

The resulting four inner-product values contain information as to where the true maximum occurs, which can be accurately identified, at sub-sample resolution, by applying a three-point peak identification method to the four correlation values, in a corresponding fashion to the peak-detection method described above for the energy window. This accurate timing information can be used to refine or replace the initial time of arrival information obtained using the CCK packet detector 308.

If the receiver module 7 has a synchronised clock, the trilateration module 311 can determine the length of a signal path between the static transmitter unit 2, 3, 4, 5 and the mobile receiver unit 7 from the time-of-arrival information. If the system is not synchronised, time differences of arrival may be used by the trilateration module 311 to determine position information—e.g., based on hyperboloid intersections.

Method II

In another set of embodiments, no preamble chips are transmitted before the CCK code. Instead, a motion-induced phase distortion is estimated based on the derivative of phase from within the CCK code.

Although Doppler phase analysis can be performed in polar or IQ (in-phase and quadrature) space, in this embodiment, the derivative of phase is calculated in IQ space, using the real and imaginary components of each chip sample, and their discrete time derivative components. This is done by evaluating the expression $$d\theta = -\frac{y}{x^2 + y^2}dx + \frac{y}{x^2 + y^2}dy,$$

where x and y are the real and imaginary parts of the complex IQ samples, and dx and dy are the changes in real and imaginary components of the complex IQ samples over a fixed time period, such as one sample period.

The CCK packet detector 308 in these embodiments uses an energy detection window that is thirty-two samples in length to detect when a candidate CCK code has been received.

The CCK code decision module 309 calculates thirty-one phase derivative values, dθ, from the thirty-two CCK code samples in the detection window.

The CCK code is oversampled by a factor of four. When no Doppler shift is present, consecutive samples within one chip should have the same modulated phase and therefore should have approximately zero phase difference between them. However, if there is an approximately-constant, non-zero phase derivative across consecutive samples, this is indicative of a phase-shift due to Doppler shift.

Figure 8:
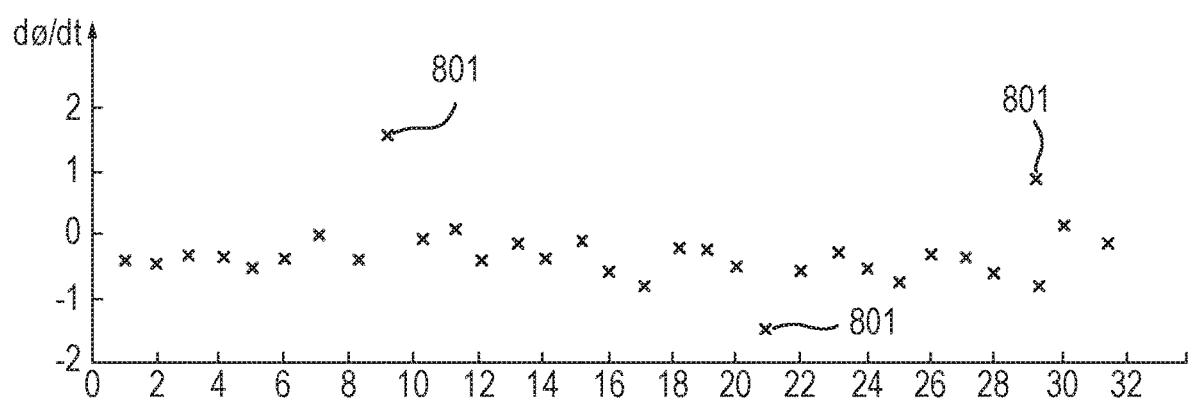
FIG. 8 is a schematic representation of groups of received samples.

FIG. 8 shows plot of the derivative of phase over time for an exemplary received signal. The average phase derivative value can be seen to be below zero, indicating the presence of Doppler shift. Large values of dθ indicate phase transitions between adjacent chips due to the QPSK encoding, as occurs at three points 801 in FIG. 8.

Next, this method identifies one sample position to represent each chip of the CCK code (e.g., the third sample from each chip), while also obtaining an initial Doppler velocity estimate. To do this, the phase derivative values dθ are first evaluated for outliers. Outliers are likely to represent phase jumps due to changes in adjacent CCK chip values, or samples heavily affected by noise. Outlier filtering is done by sorting the thirty-one phase derivative values in ascending order of magnitude, and retaining the seventeen most central dθ values and their indices. I.e., the eighth to twenty-fourth position values are retained, along with their original sample indices. An initial estimate of Doppler velocity is then obtained by averaging these seventeen retained dθ values.

An optimum sample index position to use to represent each chip is then found by reducing the indices of each of the retained seventeen dθ values by modulo four, and calculating the average of the seventeen modulo-four-reduced indices. The resulting averaged index value indicates a sample position within each chip that, on average, has a low variation in dθ and is therefore less affected by coding-induced phase changes. One complex IQ sample for each chip of the CCK code can be selected based on the optimum sample position obtained.

In some embodiments, the derivative of the magnitude of the CCK code samples is used to filter the samples, in order to optimum a representative sample position and an initial estimate of Doppler shift. The time derivative of the magnitude r of the CCK code samples can be calculated using the expression $$dr = \frac{(xdx + ydy)}{\sqrt{x^2 + y^2}}.$$

Thirty-one magnitude derivative values dr are obtained from the thirty-two CCK code samples. The dr values are sorted according to their magnitude and the sample indices of the sixteen smallest dr values are reduced modulo four and averaged. This sample position may be averaged with the value obtained from $d\theta$ above, or may be used as an alternative. An initial Doppler shift can then be estimated from the $d\theta$ values at the representative position within each chip. Filtering based on magnitude works because signal magnitude will typically change around phase transitions between adjacent chips, due to limitations in the transmitter and receiver transducers, and excluding high dr values should exclude samples that may be unreliable due to lying at the transition between pairs of chips.

The eight samples selected according to the obtained optimum sample position are then de-rotated using the initial Doppler shift estimate.

In this way, the CCK code alone can be used to perform an initial characterisation of the Doppler-shift-induced phase distortion, without the need for a preamble. Transmissions without a preamble are shorter and use less channel capacity. However, in some embodiments, this method of determining Doppler-shift-induced phase distortion may be used in conjunction with the preamble method, described above, to further improve the accuracy of the Doppler shift compensation.

If the complex IQ samples are obtained through a mixing and decimation operation at the receiver unit 7, then the derivative data of the IQ samples are preferably calculated prior to the decimation process, when the signal is available as a higher sample rate data stream. The mixing and decimation module can therefore output both IQ samples and time derivative data for the phase and magnitude of the samples.

Using an estimate of the Doppler-shift-induced phase distortion to de-rotate selected samples from the CCK chips typically removes a large proportion of the Doppler distortion. However, due to noise in the time derivatives, it typically does not remove the Doppler distortion completely. The de-rotated samples are therefore further processed to remove the residual phase component. This is done by unwrapping the phase of the de-rotated chips (from a discontinuous phase domain to a continuous phase domain) and removing any phase jumps associated with the CCK coding by subtracting integer multiples of $\pi/2$ for phase values that lie in different phase quadrants, so that the resulting phases are all brought into the range $[0, \pi/2)$. Any variation of phase within this range can then be assumed to be due to Doppler distortion that is still present in the de-rotated samples. (This assumes that the phase shift due to the residual Doppler distortion is less than $\pi/2$ radians over the four samples of each CCK chip.)

Any motion between the transmitter unit 2, 3, 4 or 5 and the mobile receiver 7 can be assumed to have a constant speed over the duration of the CCK code. Any residual phase drift should therefore change in a linear fashion with sample index, with the gradient of the linear trend characterising the residual Doppler component $\omega_r$ that needs to be removed prior to CCK code identification. The mobile receiver unit 7 therefore performs a more thorough removal of Doppler shift components by further de-rotating the selected samples using the Doppler component $\omega_r$ so that they samples are, in total, de-rotated by $\omega_d+\omega_r$.

The Doppler-compensated samples can be expressed as

Compensate_CCK_samples[$n$]=received_CCK_samples[$n$]$\times e^{-i(\omega_d+\omega_r)n}$ where n is the sample position index of each of the eight samples selected by sample selection logic in the CCK code decision module 309.

The Doppler-compensated samples are then be demodulated using a modified Fast Walsh Transform block, which may be identical to the Fast Walsh Transform block 702 described above in connection with Method I, to identify the CCK code.

The initial time-of-arrival estimate may optionally be refined or replaced through cross-correlation with the identified CCK code, as described in Method I.

Method III

In another set of embodiments, no preamble is transmitted. Instead, the non-coherent CCK code decision module 309 of the mobile receiver unit 7 uses an exhaustive-search approach to identifying the transmitted CCK code, by first cross-correlating the received signal with each of sixty-four CCK code templates (without applying any Doppler correction), then identifying a subset of the CCK code templates as candidate templates, then estimating a Doppler shift based on each candidate CCK code template, adjusting the candidate codes for Doppler shift, and finally performing a further cross-correlation operation with a subset of the Doppler-adjusted CCK code templates to identify the correct CCK code.

A carrier signal of 41 KHz is assumed in the following explanation, although the method is by no means limited to carriers of this frequency.

First, a CCK packet detector, similar to the CCK packet detector 308 described previously, identifies a candidate CCK code in the received signal, by applying an energy detection window thirty-two samples in length.

Secondly, the received samples around the identified signal portion are cross-correlated with each of the sixty-four CCK code templates. In theory, this should completely remove the phase jumps that are due to the CCK encoding for the one correctly-matched CCK code template, at a particular temporal alignment, but will not do so for the other sixty-three CCK codes, or for different temporal offsets of the matching CCK code. There should therefore be a peak in the correlation magnitude at a time position corresponding to the time of arrival of the CCK code.

Sixty-four sets of correlation magnitude output are generated, and peak correlation magnitudes are identified. All those CCK code templates that generate correlation outputs containing a peak magnitude that exceeds a predetermined threshold are selected. For each of the selected CCK code templates, a sample-wise multiplication is performed between the received signal and the complex conjugate of the CCK code template, aligned at the position of peak magnitude in the received signal. Unlike the previous cross-correlation operation, the results are not summed over the sample indices. A phase value in polar space is calculated at each sample index in the resultant template-multiplied data. The calculated phase values are then phase unwrapped from discontinuous phase to continuous phase. For the correct code, these phase values should represent phase changes due to Doppler-shift, rather than to the CCK coding itself.

A best-fit line for the unwrapped phase values is calculated, for each set of template-multiplied data. The phase data sets that have a standard deviation below within a certain threshold are retained.

If only one data set is retained, the CCK code has been decoded.

If there are multiple retained data sets, for each of the retained sets, the gradient of its best-fit line is used to adjust the corresponding CCK template by rotating each sample of the CCK template by a corresponding phase value obtained from the best-fit line. The received signal is then cross-correlated with each of this set of Doppler-compensated CCK code templates, and the CCK code that yields the highest peak correlation magnitude is identified as the transmitted CCK code.

FIG. 9 shows a flow diagram of this exhaustive CCK code search method. This method can be characterised as performing an initially cross-correlation before Doppler compensation. Some or all of the steps in FIG. 9 may be implemented in the non-coherent CCK decision module 309.

The transmitting transmitter units 2, 3, 4 or 5 transmit a respective CCK code at a chipping rate of 4,100 chips/sec. The CCK codes are modulated onto 41 kHz carriers.

At step 901, sixty-four CCK code templates are generated, or accessed, by the mobile receiver unit 7, at twice the chip sample rate (8,200 samples/s). These may be pre-computed.

At step 902 the ultrasound received by the mobile receiver unit 7 is sampled at four times the carrier frequency—i.e. at 164 kS/s (kilo-samples per second).

At step 903, mixing-decimation is performed, in which the incoming signal X(n) (sampled at four times the carrier frequency) is decimated into four streams of data (X(4n), X(4n+1), X(4n+2), X(4n+3)), each having a sample rate equalling the carrier frequency (41 kS/s). A complex IQ data stream, Z(n), is generated by the mobile receiver unit 7 as:

$$Z(n)=(X(4n+1)-X(4n+3))+j.(X(4n)-X(4n+2))$$

The complex IQ data thus also has a sample rate equal to the carrier frequency. Since the resulting IQ data stream is heavily oversampled, further bandwidth reduction is applied. In this example, a reduction of the sample rate, without the loss of information, is realised through decimation by a factor of five. This results in a complex IQ data stream at 8.2 kS/s. The IQ signal is therefore sampled at twice the chip rate of 4,100 chips/s.

The purpose of the mixing-decimation and the subsequent bandwidth reduction is that it allows the mobile receiver unit 7 to obtain IQ data directly from the modulated carrier signal using software. There is no need for conventional mixer hardware for down-converting the modulated signal.

A CCK packet detection step 904 applies a rolling energy-detection window of sixteen samples in length to the sampled received signal, to determine the approximate occurrence of a received CCK symbol. The CCK packet detector selects sixteen samples of the received signal with a total sample energy that exceeds a predetermined threshold.

At step 905 the selected sixteen IQ data samples from the CCK packet detector are cross-correlated with each of the sixty-four CCK templates. The sixteen samples are padded with zeroes on either side for performing the cross-correlation. Sixty-four sets of correlation magnitude data are generated.

At step 906 the mobile receiver unit 7 checks the magnitude values of each of the sixty-four sets of correlation data for the occurrence of at least three consecutive points that exceed a set threshold, and for the value of the peak magnitude exceeding a peak threshold. A high peak indicates a strong match with the CCK template. Only templates that satisfy these tests are selected and used for the phase analysis.

The mobile receiver unit 7 checks the selected correlation data sets at the point of maximum magnitude to determine the length of the template signal. This is then used for chip sample alignment, which is important for measuring the phase changes of the chip samples. Sampling at twice the chip rate ensures that at least one of the eight odd or even chip samples falls completely within a single phase block of the CCK code.

At step 907, for each template producing a maximum peak magnitude exceeding a set threshold, the sampled data is multiplied with the complex conjugate of the template, to generate a set of template-multiplied data.

For each set of template-multiplied data, the sixteen samples of the template multiplied data are decimated into two blocks of even and odd samples. A magnitude sum of the eight samples in each block is obtained and the block with the higher magnitude sum is selected, since this indicates the better alignment of received signal with the CCK code template.

To avoid any issues in the phase analysis due to phase wrapping, induced by Doppler shift, the phase values of the template-multiplied data samples are mapped from continuous phase space to discontinuous phase space. This is achieved by multiplying the eight selected samples of template-multiplied data by their average phase value. This operation rotates the central sample to approximately zero phase value, such that any Doppler induced phase changes are symmetric around zero phase.

For each data set, a linear best fit curve is fitted to the eight phase values. The curve characterises the linear phase trend caused by Doppler-induced distortion. The gradient of the linear best fit curve represents Doppler velocity in radians per second.

At step 908 the mobile receiver unit 7 inspects all generated linear best fit curves and filters out any sets of template-multiplied data that don't have linear best fit curves with standard deviation below a predetermined threshold. The purpose of this is to select the set of linear best fit curves that best characterise the phase distortion due to Doppler shift.

At step 909, for each selected set of template-multiplied data, the best fit curve for that set of data is used to correct its corresponding CCK code template for Doppler-induced phase shift. Each of the eight samples of the CCK code template is rotated by a phase value obtained using the Doppler velocity estimate given by the slope of the linear best fit curve. The eight Doppler compensated template samples can be expressed as $$\text{Comp\_CCK\_template\_samp}[n]=\text{CCK\_temp\_samp}[n]\times e^{-i\omega_d n}$$

where n={0,1,2,3,4,5,6,7} and $\omega_d$ is the Doppler velocity in radians per second.

(Note, that, in all the description herein, the indexing of the samples may be scaled in any appropriate way. Sample indices can be mapped to other time measures—e.g., to a clock or counter value in the mobile receiver unit 7—in any appropriate way.)

At step 910, the Doppler-compensated CCK code templates are cross-correlated with the eight selected samples of the received signal. The peak magnitude of each correlation output is used to identify the transmitted CCK code at step 911. A three point peak detection method, as previously described, can be used to determine a precise time of arrival for the peak.

Thus the received CCK code and its time of arrival are determined.

In some embodiments, one or more samples of the sixty-four sets of template-multiplied data may be excluded from the calculation of the linear best fit curve for the phase values. The exclusion of certain samples may depend on the CCK code template used to generate the respective set of template-multiplied data. For example, the phase value of the sample immediately preceding each CCK coding-induced phase jump, and the phase value of the sample immediately following each CCK coding induced phase jump, may be excluded. The remaining samples of the template-multiplied data may be retained. In this manner, the samples that are most heavily affected by CCK coding-induced phase jumps can be excluded so they don't contribute to determining the best fit curve for the template multiplied data.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A system for determining a position of a mobile receiver unit in an environment, the system comprising:
a plurality of transmitter units, each comprising a transmitter and configured to transmit a respective transmitter-unit identifier, phase-modulated on an acoustic carrier signal;
a mobile receiver unit comprising a receiver and configured to receive an acoustic signal, from a transmitter unit of the plurality of transmitter units, encoding a transmitter-unit identifier; and
a processing subsystem configured to:
sample received signals to generate sampled data representing the received signals, wherein the transmitter-unit identifier spans a transmitter-unit-identifier-bearing portion of the sampled data;
obtain template data corresponding to the transmitter-unit identifier;
analyze the transmitter-unit-identifier-bearing portion of the sampled data to determine a Doppler-induced phase deviation within the transmitter-unit-identifier-bearing portion of the sampled data;
adjust the template data or the sampled data so as to change one or more phase shifts within the template data or within the transmitter-unit-identifier-bearing portion of the sampled data by an amount that depends on the determined Doppler-induced phase deviation;
cross-correlate the template data with the transmitter-unit-identifier-bearing portion of the sampled data, after the adjusting;
determine a time of arrival of the transmitter-unit identifier at the mobile receiver unit;
decode the transmitter-unit identifier from the sampled data;
use an output of the cross-correlation when determining the time of arrival or when decoding the transmitter-unit identifier; and
use the time of arrival and the decoded transmitter-unit identifier to determine information relating to the position of the mobile receiver unit in the environment.

2. The system of claim 1, wherein the mobile receiver unit comprises all or a part of the processing subsystem, and wherein the processing subsystem comprises a processor and a memory storing software instructions for execution by the processor.

3. The system of claim 1, wherein each transmitter-unit identifier comprises a different respective Complementary Code Keying (CCK) code.

4. The system of claim 1, wherein the processing subsystem uses the determined Doppler-induced phase deviation to determine speed or velocity information for the mobile receiver unit.

5. The system of claim 1, wherein the processing subsystem is configured to use a sliding energy window to detect the transmitter-unit identifier within the sampled data.

6. The system of claim 5, wherein the energy window is applied to the sampled data to generate a sequence of energy values, wherein each energy value represents the energy of the samples within the energy window at a respective position of the energy window within the sampled data, and wherein the processing subsystem is configured to determine a time-of-arrival estimate for the transmitter-unit identifier from the temporal position of a peak in the energy values.

7. The system of claim 6, wherein the sampled data comprises samples at intervals, and wherein the processing subsystem is configured to derive gradient information from the energy values, and to use the gradient information to identify a location of a peak in the energy values at a temporal resolution that is finer than the intervals.

8. The system of claim 1, wherein each encoded transmitter-unit identifier comprises a first reference symbol at a first position and a second reference symbol at a second position, wherein the first and second reference symbols have a predetermined phase relationship, and wherein the processing subsystem is configured to determine the Doppler-induced phase deviation from samples of the reference symbols.

9. The system of claim 8, wherein the first and second reference symbols are adjacent symbols and are offset by 180 degrees.

10. The system of claim 8, wherein the processing subsystem is configured, when adjusting the template data or the sampled data, to adjust only one sample, at a common sample index, for each symbol of a distinguishing portion of the transmitter-unit identifier, and is configured to determine which sample to adjust by rotating two or more of the reference symbols based on the Doppler-induced phase deviation, and then, for each sample index within one symbol, analyzing the reference symbols at that sample index, and selecting the sample index that has a highest score from a quality criterion.

11. The system of claim 1, wherein the processing subsystem is configured to determine the Doppler-induced phase deviation by calculating the derivative of the phase of the sampled data, over time, within a distinguishing portion of the transmitter-unit identifier.

12. The system of claim 11, wherein the processing subsystem is configured to calculate a phase derivative for a set of one or more consecutive pairs of samples within the transmitter-unit-identifier-bearing portion, the set being obtained by filtering out samples, or derivative values, affected by coding-induced phase shifts in the transmitter-unit identifier.

13. The system of claim 1, wherein the processing subsystem is configured to analyze the sampled data to determine, for each of a plurality of transmitter-unit- identifier templates, a respective estimate of Doppler-induced phase deviation within the transmitter-unit-identifier-bearing portion of the sampled data, and is configured to test a quality of each estimate of Doppler-induced phase deviation and filter transmitter-unit identifiers for which the respective estimate does not meet a quality criterion.

14. The system claim 13, wherein the processing subsystem is configured to use the filtering to decode the transmitter-unit identifier, by, when only one transmitter-unit identifier remains after the filtering, identifying the transmitter-unit identifier as the decoded transmitter-unit identifier; and, when a plurality of transmitter-unit identifiers remain after the filtering, adjusting the respective transmitter-unit-identifier template for each remaining transmitter-unit identifier so as to change one or more phase shifts within the respective transmitter-unit-identifier template by an amount that depends on the respective estimate of Doppler-induced phase deviation for that transmitter-unit identifier template, cross-correlating each adjusted transmitter-unit-identifier template with the sampled data, and identifying the transmitter-unit identifier corresponding to the adjusted transmitter-unit-identifier template that has a highest correlation peak out of all the adjusted transmitter-unit-identifier templates as the decoded transmitter-unit identifier.

15. A method of determining a position of a mobile receiver unit in an environment, the method comprising:
sampling acoustic signals received by the mobile receiver unit to generate sampled data representing the received signals, wherein a transmitter-unit identifier of a transmitter unit spans a transmitter-unit-identifier-bearing portion of the sampled data;
providing template data corresponding to the transmitter-unit identifier;
analysing the transmitter-unit-identifier-bearing portion of the sampled data to determine a Doppler-induced phase deviation within the transmitter-unit-identifier-bearing portion of the sampled data;
adjusting the template data or the sampled data so as to change one or more phase shifts within the template data or within the transmitter-unit-identifier-bearing portion of the sampled data by an amount that depends on the determined Doppler-induced phase deviation;
cross-correlating the template data with the transmitter-unit-identifier-bearing portion of the sampled data, after the adjusting;
determining a time of arrival of the transmitter-unit identifier at the mobile receiver unit;
decoding the transmitter-unit identifier from the sampled data;
using an output of the cross-correlation when determining the time of arrival or when decoding the transmitter-unit identifier; and
using the time of arrival and the decoded transmitter-unit identifier to determine information relating to the position of the mobile receiver unit in the environment.

16. The method of claim 15, wherein the acoustic signals are ultrasonic signals.

17. The method of claim 15, wherein the transmitter units are static.

18. The method of claim 15, wherein each transmitter-unit identifier comprises a different respective Complementary Code Keying (CCK) code.

19. The method of claim 15, further comprising using a sliding energy window to detect the transmitter-unit identifier within the sampled data.

* * * * *